US011130391B2

(12) United States Patent
Choi et al.

(10) Patent No.: US 11,130,391 B2
(45) Date of Patent: Sep. 28, 2021

(54) ACTIVE GLARE SUPPRESSION SYSTEM

(71) Applicant: Apple Inc., Cupertino, CA (US)

(72) Inventors: Hyungryul J. Choi, San Jose, CA (US); Arthur Y. Zhang, San Jose, CA (US); Cheng Chen, San Jose, CA (US); Graham B. Myhre, San Jose, CA (US); Malcolm J. Northcott, Santa Cruz, CA (US); Matheen M. Siddiqui, Santa Clara, CA (US); Russell Y. Webb, San Jose, CA (US); Matthew E. Last, San Jose, CA (US)

( * ) Notice: Subject to any disclaimer, the term of this patent is extended or adjusted under 35 U.S.C. 154(b) by 392 days.

(21) Appl. No.: 15/758,660

(22) PCT Filed: Sep. 1, 2016

(86) PCT No.: PCT/US2016/049880
§ 371 (c)(1),
(2) Date: Mar. 8, 2018

(87) PCT Pub. No.: WO2017/053040
PCT Pub. Date: Mar. 30, 2017

(65) Prior Publication Data
US 2018/0304727 A1 Oct. 25, 2018

Related U.S. Application Data

(60) Provisional application No. 62/221,524, filed on Sep. 21, 2015.

(51) Int. Cl.
*B60J 3/04* (2006.01)
*B60J 3/06* (2006.01)
*B60R 16/037* (2006.01)
(52) U.S. Cl.
CPC . *B60J 3/04* (2013.01); *B60J 3/06* (2013.01); *B60R 16/037* (2013.01)

(58) Field of Classification Search
CPC .............. B60J 3/04; B60J 3/06; B60R 16/037
See application file for complete search history.

(56) References Cited

U.S. PATENT DOCUMENTS

| 4,892,394 A | 1/1990 | Bidabad |
| 5,305,012 A | 4/1994 | Faris |
(Continued)

FOREIGN PATENT DOCUMENTS

DE 19952945 A1 5/2001

OTHER PUBLICATIONS

Friedland, Heath Theodore, "The Effectiveness of Glare-Obscuring Glasses on Nighttime Driving Performance" (2012). Master's Theses, San Jose State University, Paper 4194.
(Continued)

*Primary Examiner* — Georgia Y Epps
*Assistant Examiner* — Don J Williams
(74) *Attorney, Agent, or Firm* — Treyz Law Group, P.C.; G. Victor Treyz; Kendall W. Abbasi

(57) ABSTRACT

A vehicle may have optical structures such as windows and mirrors that have the potential to allow glare from external objects to shine into the eyes of a driver or other vehicle occupant. A control circuit may gather information on where the eyes of the driver are located using a camera mounted in the vehicle and may gather information on where the sun or other source of glare are located outside of the vehicle. Based on this information, the control circuit may direct a light modulator on a window or mirror to selectively darken an area that prevents the glare from reaching the eyes of the driver. The light modulator may have a photochromic layer that is adjusted by shining light onto the photochromic layer, may be a liquid crystal modulator, an electrochromic modulator, or other light modulator layer.

21 Claims, 20 Drawing Sheets

(56) References Cited

U.S. PATENT DOCUMENTS

| | | | | |
|---|---|---|---|---|
| 5,541,762 | A * | 7/1996 | Levy | B60R 1/088 |
| | | | | 359/237 |
| 7,199,767 | B2 | 4/2007 | Spero | |
| 7,232,176 | B1 * | 6/2007 | Dopwell | B60J 3/0204 |
| | | | | 160/23.1 |
| 2003/0169213 | A1 | 9/2003 | Spero | |
| 2003/0231398 | A1 | 12/2003 | Cutaia | |
| 2006/0175859 | A1 | 8/2006 | Isaac | |
| 2007/0047089 | A1 * | 3/2007 | Mardirossian | B60J 3/04 |
| | | | | 359/609 |
| 2009/0073590 | A1 * | 3/2009 | Englander | B60R 1/083 |
| | | | | 359/872 |
| 2012/0019891 | A1 * | 1/2012 | Dewell | G02F 1/163 |
| | | | | 359/275 |
| 2012/0126099 | A1 | 5/2012 | Tewari et al. | |
| 2014/0362428 | A1 * | 12/2014 | Chen | B60Q 3/70 |
| | | | | 359/244 |
| 2017/0028908 | A1 * | 2/2017 | Curtis | H05B 45/00 |

OTHER PUBLICATIONS

Anupama V et al., Automatic Anti-Glare System for Night Time Driving Using Liquid Crystal Screens, International Journal of Research in Engineering and Technology, Jan 2014, p. 202-205, vol. 3 Issue 1.

* cited by examiner

ACTIVE GLARE SUPPRESSION SYSTEM

This application claims priority to U.S. provisional patent application No. 62/221,524, filed Sep. 21, 2015, which is hereby incorporated by reference herein in its entirety.

BACKGROUND

This relates generally to reducing glare and, more particularly, to reducing glare in vehicles.

Vehicles such as automobiles have a rear mirror and left and right side mirrors. Ambient light such as sunlight and light from headlights can reflect off of the mirrors and into the eyes of a driver. A driver may also be exposed to sunlight, light from headlights, and other sources of glare through the windows of a vehicle. Sunshades and window tinting may be used to reduce glare somewhat, but can be cumbersome and ineffective.

It would therefore be desirable to be able to provide improved ways in which to reduce glare in a vehicle.

SUMMARY

A vehicle may have structures such as windows and mirrors that have the potential to allow glare from external objects to shine into the eyes of a driver or other vehicle occupant. The windows may be side windows, front windows, windows on a vehicle roof, rear windows, or other suitable windows. The mirrors may be mounted on the left or right side of a vehicle (i.e., the mirrors may be vehicle mirrors such as side mirrors) and/or may be mounted in the interior of a vehicle to serve as a rearview mirror. A control circuit may gather eye location information indicating where the eyes of the driver are located using a sensor such as a camera mounted in the vehicle and may gather information on where an external object that produces glare such as the sun, a reflective portion of a vehicle (e.g., a shiny bumper or rear window on a vehicle on a roadway), a street lamp, or other source of glare is located outside of the vehicle and the direction in which the external (exterior) object is projecting light towards the vehicle (e.g., towards the eyes of a driver or other vehicle occupant). Based on this information, the control circuit may direct a light modulator on a window or vehicle mirror to selectively darken an area that prevents the glare from reaching the eyes of the driver.

The light modulator may be patterned to form a series of strips, rectangular regions, or areas of other shapes that extend along the upper edge of the front window of a vehicle and that therefore allow the light modulator to serve as an electrically adjustable sun shade. A light modulator may also be incorporated into other windows in a vehicle to reduce glare from headlights, the sun, and other light sources. Vehicle mirrors that are provided with light modulators can be adjusted to selectively darken a portion of the mirror that would otherwise reflect glare into the eyes of the driver.

A light modulator for a window or vehicle mirror may have a photochromic layer that is adjusted by shining light onto the photochromic layer, may be a liquid crystal modulator, may be an electrochromic modulator, or may be formed using other types of light modulator structures. The light modulator in a window or vehicle mirror may be supported on a transparent glass layer such as a glass layer in a vehicle mirror or vehicle window or may be supported by other support structures such as plastic and/or glass structures in vehicle windows or vehicle mirrors.

If desired, bleaching light may be used to photo-bleach photo-bleachable photochromic layers in light modulators. Arrays of light-emitting elements may be used to provide light to selectable areas of a photochromic layer in a photochromic light modulator. Arrays of electrodes may be used to apply control signals to light modulating cells in liquid crystal modulators, electrochromic modulators, and other light modulators that are controlled by applied electrical signals rather than applied light.

DETAILED DESCRIPTION

Systems such as vehicles and other systems may have transparent structures such as windows and reflecting structures such as mirrors. Sunlight and other light sources (e.g., headlights, street lights, etc.) can create undesired glare. Light modulating devices may be used to help block the glare. The light modulating devices may be incorporated into optical structures such as transparent and reflecting structures in the vicinity of a driver or other occupant of a vehicle or may be incorporated into optical structures in other environments that are prone to glare.

Light modulating devices may, for example, include a light modulating layer on the surface of a mirror to block undesired light from the sun or other light source. A light modulating layer may also be incorporated into a window to block undesired light. Electronic control systems may be used to determine an optimum location for the light blocking structures in a vehicle or other system and may adjust the light modulating devices accordingly. With this approach, the electronic control system and light modulator layer may serve as an active antiglare system.

An active antiglare system may be used in any suitable environment in which glare is present (e.g., in a boat, airplane, helicopter, motorcycle, train, truck, construction vehicle, or other vehicle, house, office, store, or other building, etc.). Antiglare layers may be formed on mirrors and/or windows or other optical layers that can serve as supporting surfaces for light modulators in these environments. Configurations in which antiglare layers are incorporated into the windows and/or mirrors in a vehicle are sometimes described herein as an example.

Figure 1:
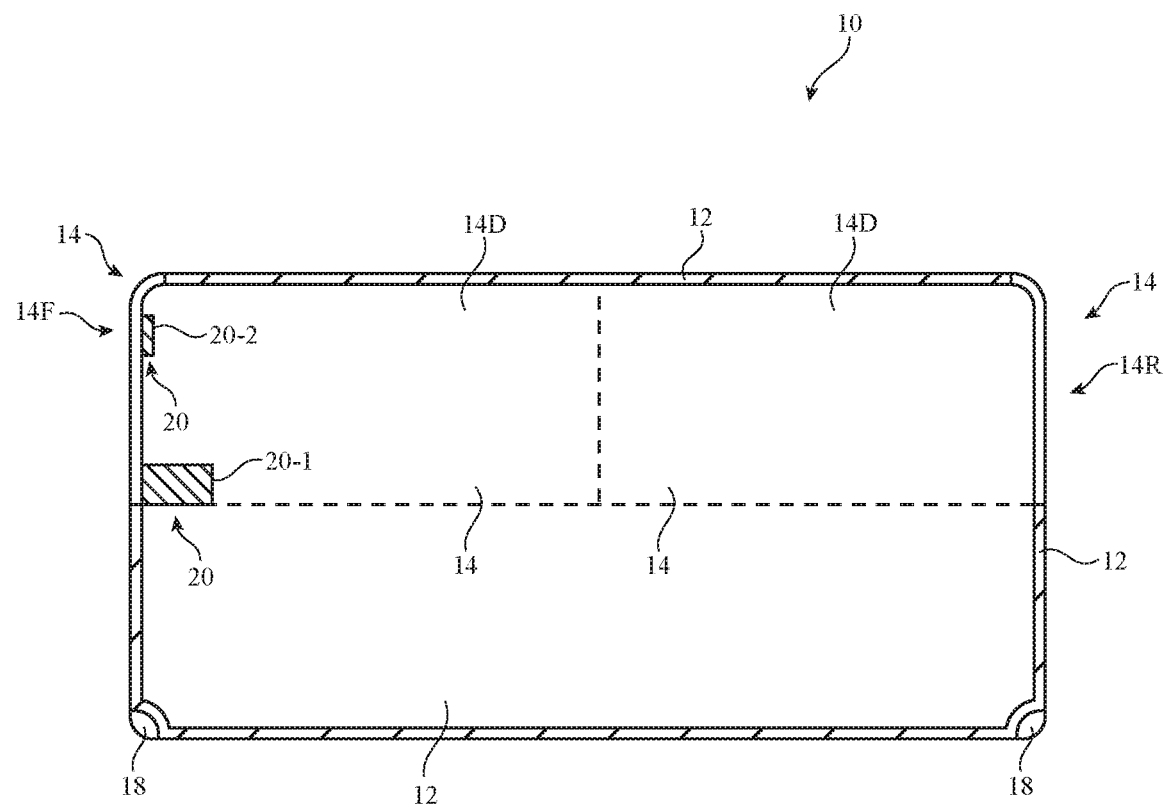
FIG. 1 is a side view of a portion of an illustrative vehicle in accordance with an embodiment.

A side view of a portion of an illustrative vehicle of the type that may be provided with an antiglare system is shown in FIG. 1. As shown in FIG. 1, vehicle 10 may include a body such as body 12. Body 12 may have body panels and other structures that are mounted on a chassis. Portions of body 12 may include doors. Interior components in vehicle 10 such as seating for a driver and other vehicle occupants may be supported by the chassis. External components such as wheels 18 may also be mounted to the chassis. The structures that make up body 12 may include metal structures, structures formed from fiber-composite materials such as carbon-fiber materials and fiberglass, plastic, and other materials.

Windows 14 may be formed at the front and rear of vehicle 10 in openings in body 12 and may be formed within the doors or other portions of the body 12 of vehicle 10. As shown in FIG. 1, for example, vehicle 10 may have a front window such as front window 14F that faces the front of vehicle, rearward facing windows such as rear window 14R, and side windows such as windows mounted within the doors of vehicle 10 (see, e.g., side windows 14D). Windows 14 may be formed from glass (e.g., glass laminated with polymer layers), plastics such as polycarbonate, or other clear materials.

Vehicle 10 may include vehicle mirrors 20. Vehicle mirrors 20 may include side mirrors 20-1 on the left and right sides of vehicle 10 and rear view mirror 20-2.

To reduce the glare experienced by a driver in vehicle 10, transparent and reflective structures such as windows 14 and vehicle mirrors 20 may be provided with light modulator layers. The light modulator layers may be actively controlled by control circuitry in vehicle 10 using information on the location of light sources that are producing glare (glare location information), using information on the location of the driver's eyes (eye location information) and/or information on the direction from which exterior light is being projected towards the driver's eyes from the light sources (e.g., from the sun, headlights, reflective surfaces of vehicles and other objects, street lights, and other external objects that produce glare), and using the known locations of the light modulator layers (light modulator layer location information). Light modulation may be produced by illuminating a photochromic layer with light to selectively darken the photochromic layer or by otherwise modulating light transmission and/or reflection (e.g., by applying signals to appropriate electrodes in a light modulator that is electrically controlled using an array of electrodes).

Figure 2:
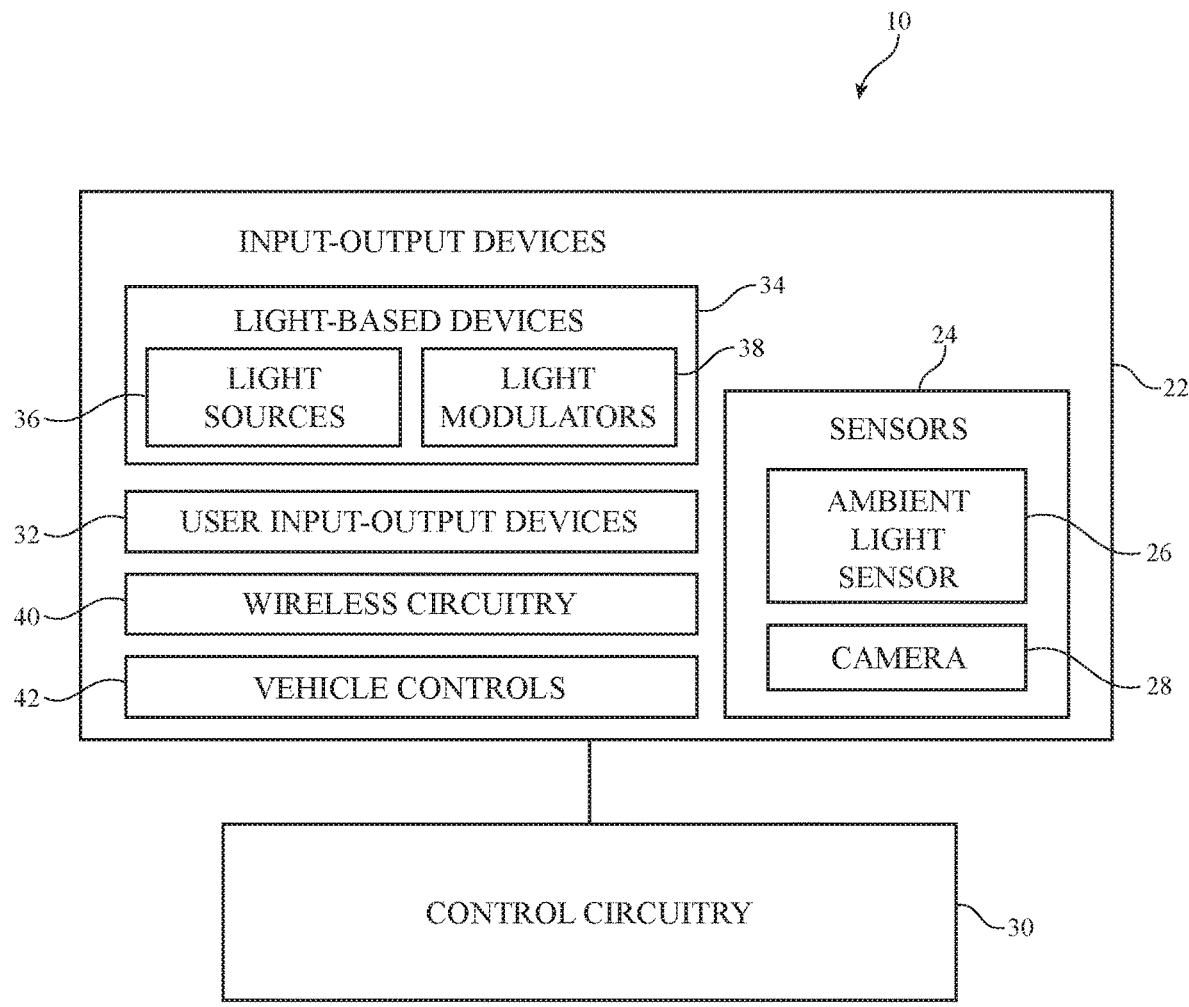
FIG. 2 is a schematic diagram of an illustrative vehicle or other system with glare reduction devices in accordance with an embodiment.

A schematic diagram of an illustrative circuitry that may be used in operating vehicle 10 is shown in FIG. 2. As shown in FIG. 2, vehicle 10 may include control circuitry 30. Control circuitry 30 may include storage and processing circuitry for supporting the operation of vehicle 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 30 may be used to control light modulators and other devices operating in vehicle 10. The processing circuitry may be based on one or more microprocessors, microcontrollers, digital signal processors, baseband processors, power management units, audio chips, application specific integrated circuits, electronic control units, etc.

Vehicle 10 may include input-output devices 22 that allow data to be supplied to vehicle 10 and that allow data to be provided from vehicle 10 to external systems. Input-output devices 22 may include sensors 24 for gathering information on the operating environment of vehicle 10. Sensors 24 may include light-based sensors, wireless sensors such as radar sensors, ultrasonic sensors, proximity sensors, range-finding sensors, ambient light sensors such as ambient light sensor 26 that measure that amount of light on the exterior of vehicle 10 and/or the interior of vehicle 10, sensors such as camera 28 (e.g., stereoscopic cameras or other camera systems including digital image sensors and/or other light-based sensors or other sensors for detecting a user's head position, a user's eye position and/or a user's direction of gaze), strain gauges, parking sensors, cruise control sensors, accelerometers, touch sensors, magnetic sensors such as electronic compass sensors, temperature sensors, rain sensors and other moisture sensors, force sensors, pressure sensors (e.g., altimeters), and other components for making measurements on the environment surrounding vehicle 10.

As shown in FIG. 2, input-output devices 22 may include user input-output devices 32. Devices 32 may be used to gather input from users (e.g., a driver or passenger of vehicle 10) and may be used in providing output to users. Devices 32 may include buttons, joysticks, steering wheels, shift levels and/or buttons, foot-actuated controllers (e.g., a throttle pedal, a brake pedal, a clutch pedal, etc.), touch pads, keypads, keyboards, motion sensors, microphones, cameras, and other devices for gathering user input. Input devices in devices 32 may also circuitry for generating audio output such as speakers, tone generators, and vibrators and circuitry for generating visible output.

Light-based devices 34 may include internal devices and external devices for providing light-based output. Light-based devices 34 may include, for example, light sources 36. Light sources 36 may include devices that produce light in response to applied electrical current such as lamps, light-emitting diodes and other status indicators, displays, lasers, arrays of light sources, individual light sources, backlight units for displays, light sources that emit one or more beams of light (e.g., a laser beam, light-emitting diode beam, or a beam associated with another collimated light source), light sources that emit light in a fixed pattern of one or more beams, light sources that emit light using raster scanning techniques, light sources that emit steerable beams (e.g., light sources with mirror arrays to steer light in a light projector system, light sources with one or more steerable mirrors, steerable lasers and light-emitting diodes, etc.), and other electrically controlled light sources.

Light modulators 38 may include mechanical and/or electrical modulators such as mechanical shutters, liquid crystal modulators (e.g., liquid crystal shutters having polarizers), modulators based on cholesteric liquid crystals or other structures that exhibit opaque (light scattering) and transparent modes, guest-host liquid crystal modulators, electrochromic modulators, light modulators based on electrically bleached and/or photo-bleached photochromic layers, and other light modulators.

Light-based devices 34 (e.g., light sources 36 and/or light modulators 38) may contain individually controlled areas. These areas may be relatively small areas that may serve as pixels in an array of pixels for a display-type output device (e.g., a heads-up display integrated into a window) and/or that create small antiglare patterns (e.g., small dark areas that shadow a driver's eyes from glare). If desired, the individually controlled areas may include one or only a few larger controlled areas (e.g., areas that are patterned to form electrically adjustable sun visor patterns or other antiglare patterns on a window, antiglare areas on mirrors, etc.).

Wireless circuitry 40 may include radio-frequency transceiver circuitry and antennas for transmitting and receiving wireless signals. The signals may include, for example, short-range signals such as wireless local area network signals (WiFi® and Bluetooth® signals) and long-range signals (e.g., cellular telephone signals and other signals at frequencies of 700 MHz to 2700 MHz and/or other suitable frequencies). Wireless information may be shared with nearby vehicles, sensors and beacons embedded along a roadway, satellites, cellular telephone networks, cellular telephones, wristwatches, and other wireless devices associated with a driver and passengers in vehicle 10, etc. Wireless information that is received by circuitry 40 may include traffic information, weather information, information on the status of nearby vehicles (e.g., direction of motion, acceleration/deceleration, brake status (braking due to application of brakes by a driver or not braking), throttle status (applied or not applied), temperature information, road condition information (as measured by sensors in vehicles and/or external sensors), etc.

Vehicle controls 42 may include control circuitry, actuators, and other systems for controlling vehicle operation. Vehicle controls 42 may include systems for steering, braking (manual brakes, emergency brakes, power-assisted brakes, drum brakes, disc brakes, regenerative brakes that use drive motors or other systems to recover energy and convert the kinetic energy of vehicle 10 into electrical energy stored in capacitors and/or batteries or that use other techniques for storing recovered energy, or other braking systems), accelerating, shifting gears, adjusting interior and exterior lights, adjusting infotainment functions, controlling satellite navigation system operation, adjusting airbags, seatbelts, and other safety devices, controlling audio output, controlling electronic windows, door locks, the opening and closing of doors and hatches, windshield wipers, defrosters, and other climate controls, and systems for controlling and adjusting other operations during the operating of vehicle 10.

Using information from sensors 24, user input from devices 32 and other input from devices 22, and/or information received wirelessly from remote sources via wireless circuitry 40, vehicle 10 may take actions to reduce the amount of light reaching a driver or other occupant of vehicle 10. For example, control circuitry 30 may use sensors 24 to determine that the sun is shining in the upper portion of the front window directly towards the eyes of the driver. In this situation, control circuitry 30 may direct a light modulator on the front window to selectively darken a portion of the front window that lies directly between the sun and the driver's eyes, thereby shadowing the driver's eyes from the glare of the sun. As another example, a vehicle that is located behind the driver's vehicle may be shining its headlights into vehicle mirrors 20. Control circuitry 30 may use sensors 24 to detect this light and to direct a light modulator in the mirror to create darkened areas that prevent reflection of the light into the eyes of the driver. The non-darkened portions of the windows and mirrors in these types of scenarios remain in their normal state, so that the driver can continue to observe the surroundings of the vehicle.

Figure 3:
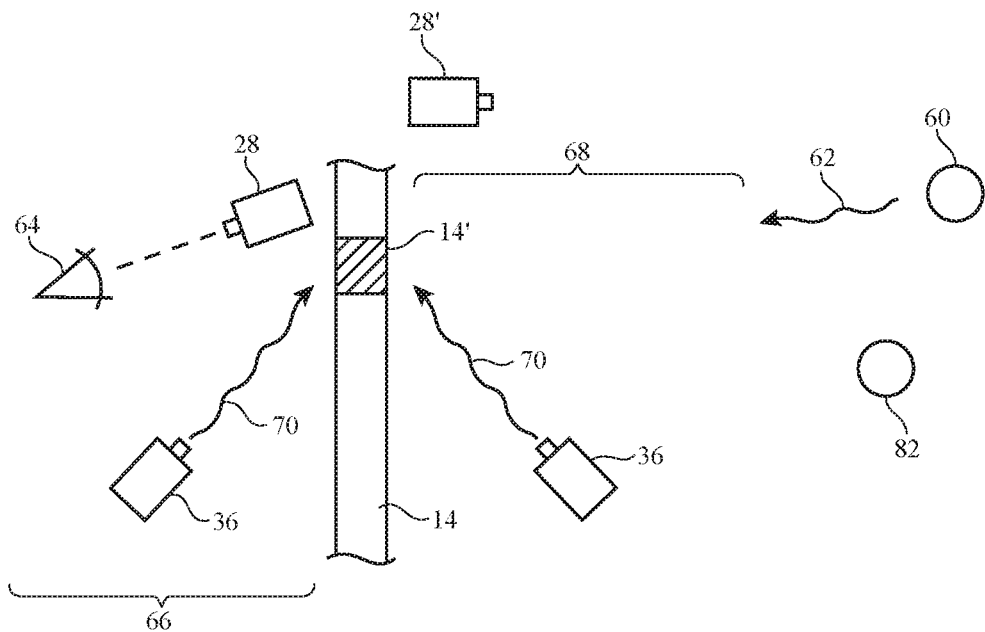
FIG. 3 is a cross-sectional side view of an illustrative window in which a portion may be locally darkened to reduce glare in accordance with an embodiment.

An illustrative scheme for reducing glare using a light modulator incorporated into a transparent layer such as a window is shown in FIG. 3. In the example of FIG. 3, external light source 60 is producing unwanted glare (i.e., light beam 62) that is directed towards the eyes of the driver (see, e.g., eye 64). A sensor such as camera 28 or other suitable sensor may monitor the face of the driver to identify the location of the driver's eyes. Control circuitry 30 may obtain information on the location of external sources of glare such as external light source 60 by using an externally mounted sensor such as camera 28' (or other light detector) to measure the position of external light source 60. If desired, sun position information may be calculated using information on the location and orientation of vehicle 10 and on the current time and date (e.g., using orientation information from a rotation sensor that is Kalman-filtered using output from a Global Positioning System (GPS) receiver to establish reliable low frequency orientation data, GPS information, compass heading information, accelerometer information, or other orientation sensor information, information from a clock, etc.). Information on the location of the headlights of other vehicles relative to vehicle 10 may be established using wireless communications (e.g., using vehicle-to-vehicle communications, etc.). By using information on the location of eyes 64 (eye location information) and/or information on the direction from which external object (glare source) 60 is projecting light toward eyes 64 and by using information on the location of glare source 60 (glare location information) in combination with the known location of the light modulator on window 14 (light modulator location information), control circuitry 30 can determine an optimum location for locally darkening window 14. As shown in FIG. 3, for example, portion 14' of window 14 may be darkened to block light 62 from light source 60 and thereby shield eyes 64 from light 62 without blocking the driver's view of external objects such as object 82 (e.g., objects on the road on which vehicle 10 is being drive).

With one suitable arrangement, window 14 may include a layer of photochromic material that changes from transparent to opaque (e.g., black, white, etc.) when exposed to light 70. Light 70 may be ultraviolet light or light with other suitable wavelengths (e.g. infrared, visible light of appropriate wavelengths, etc.). Ultraviolet light 70 may be generated by a light source such as an electrically controlled light source 36 in vehicle interior 66 or an electrically controlled light source 36 in exterior region 68.

Figure 4:
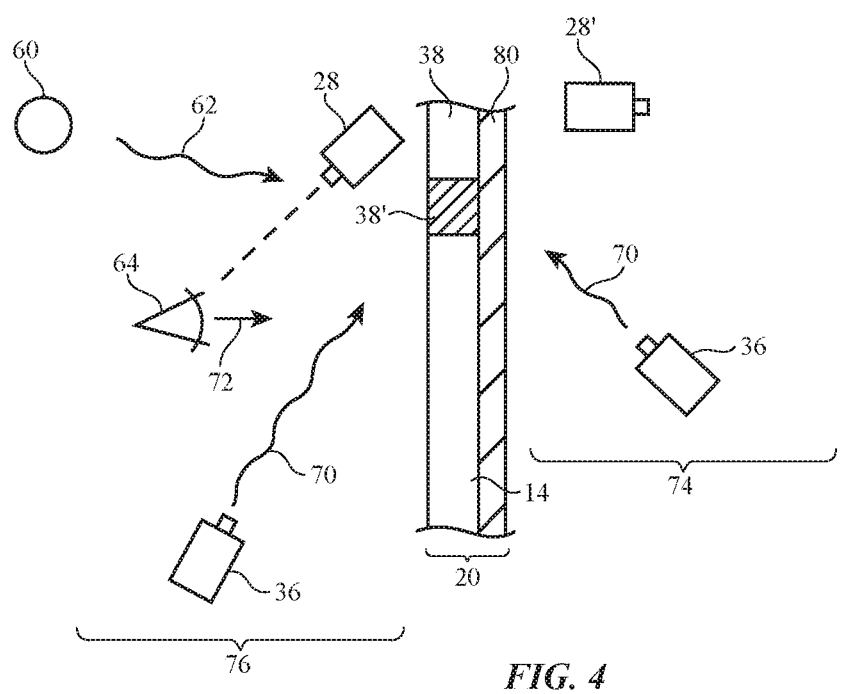
FIG. 4 is a cross-sectional side view of an illustrative mirror in which a portion may be locally darkened to reduce glare in accordance with an embodiment.

As shown in FIG. 4, this type of light-based modulation scheme may be used in a mirror. In the example of FIG. 4, a driver is looking at mirror 20 in direction 72. Light 62 from the sun or other light source 60 may have the potential to reflect from mirror 20 into the eyes of the driver in region 76 in front of mirror 20 (see, e.g., eye 64 of FIG. 4). To block this potential glare, region 38' of light modulating layer 38 may be selectively darkened (i.e., rendered opaque). Layer 38 may be a light modulation layer based on a layer of photochromic material that is darkened when exposed to light 70 from one or more light sources 36. Light sources 36 may be located in region 76 in front of mirror 20 or in region 74 behind mirror 20. A reflective layer such as layer 80 may be interposed between light source 36 in region 74 and layer 38 to create a reflective surface for mirror 20 (i.e., a reflective layer that reflects visible exterior light).

Reflective layer 80 may be formed from a series of dielectric layers (e.g., inorganic dielectric layers and/or organic dielectric layers) with different indices of refraction. For example, reflective layer 80 may be formed from a series of alternating high-index-of-refraction and low-index-of-refraction layers that form a Bragg reflector. The sublayers that make up the Bragg reflector (i.e., the layers that make up reflective layer 80) may be configured to reflect visible light (so that mirror 20 reflects visible light for the driver) while passing light 70 (e.g., while passing ultraviolet light 70 or light 70 of other wavelengths to layer 38). This allows light 70 from behind mirror 20 to pass through layer 80 and illuminate a selected portion of photochromic layer 38 to form darkened portion 38'.

Figure 5:
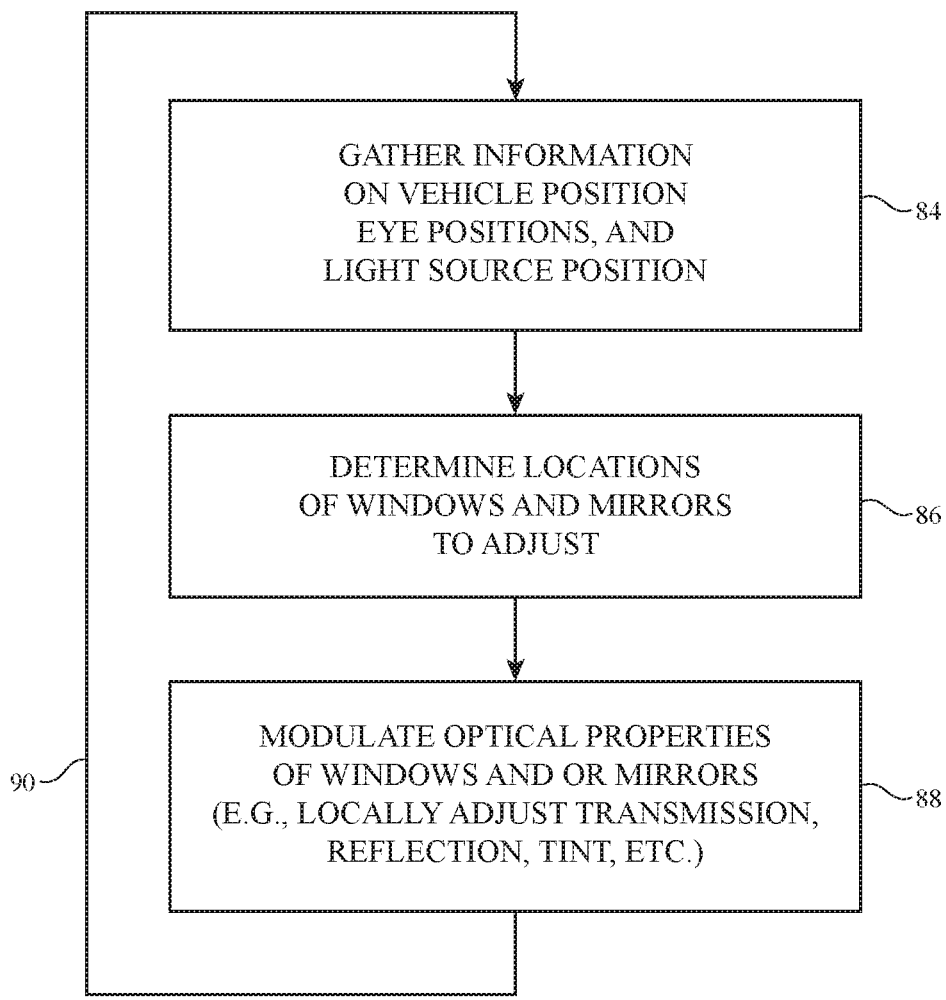
FIG. 5 is a flow chart of illustrative steps involved in adjusting a glare reduction device in real time to reduce glare in accordance with an embodiment.

FIG. 5 is a flow chart of illustrative steps involved in using a light modulator to reduce glare in vehicle 10.

At step 84, information may be gathered on the operating environment of vehicle 10. For example, sensors such as camera 28 may be used to determine where the driver of vehicle 10 is located, where the head of the driver is located, and wherein the eyes of the driver are located. The direction of the driver's gaze may be determined by analyzing images of the driver's head and eyes. For example, control circuitry 30 can use information from camera 28 to determine whether the user is viewing external objects through front window 14F or other windows 14 in vehicle 10, whether the user is viewing objects that have been reflected from mirrors 20, etc. In addition to determining the location of the driver's eyes and/or the direction of the driver's gaze (i.e., the direction in which the driver is looking), control circuitry 30 can use other sensors 24 such as ambient light sensors, external cameras such as cameras 28' of FIGS. 3 and 4, and can use information on the time of day, vehicle location, orientation, direction of travel, etc. (e.g., information from an orientation sensor, Global Positioning System receiver or other satellite navigation system receiver, clock, etc.), to determine where external light sources such as source 60 are located relative to windows 14, mirrors 20, and the driver's eyes (and/or the driver's viewing direction).

Based on knowledge of these factors (e.g., driver viewing direction and/or driver eye location, light source location, and the known location of intervening optical structures such as windows 14 and mirrors 20 that incorporate light modulating structures), control circuitry 30 can calculate the locations of the regions of the light modulating structures in vehicle 10 that should be modified to block glare from light source 60. In particular, at step 86, control circuitry 30 can determine which areas of transparent structures such as windows 14 and which areas of reflective structures such as mirrors 20 should be darkened (or otherwise provided with reduced light transmission properties).

After determining which portions of the light modulating layer(s) of windows 14 and/or mirrors 20 should be adjusted, control circuitry 30 may, at step 88, supply corresponding control signals to the light modulating structures of windows 14 and/or mirrors 20 at step 88. For example, control circuitry 30 can modulate the light transmission properties of a region of a light modulator layer in window 14 to produce reduced transmission region 14' of FIG. 3 and/or may reduce the transmission of a portion of layer 38 of mirror 20 of FIG. 4 to produce reduced-transmission portion 38'. Light modulation (e.g., light transmission adjustments) of selected portions of a light modulator layer in a window or mirror may be accomplished using electrical control (e.g., applying a voltage to an electrode in a light modulator to adjust a direct-current or alternating-current electric field), by applying heat (e.g., by applying a current to a heating electrode), by applying light 70 to a photochromic layer (see, e.g., light 70 from light sources 36 of FIGS. 3 and 4), by controlling magnetic fields applied to nano-ferromagnetic fluids, or by otherwise applying a stimulus to a selected portion of a light modulator layer. By decreasing the light transmission of appropriate portions of a window or mirror in this way, glare (undesired light 62) that reaches the eyes of the driver may be minimized. As indicated by line 90, these glare reduction activities may be performed continuously during operation of vehicle 10.

Figure 6:
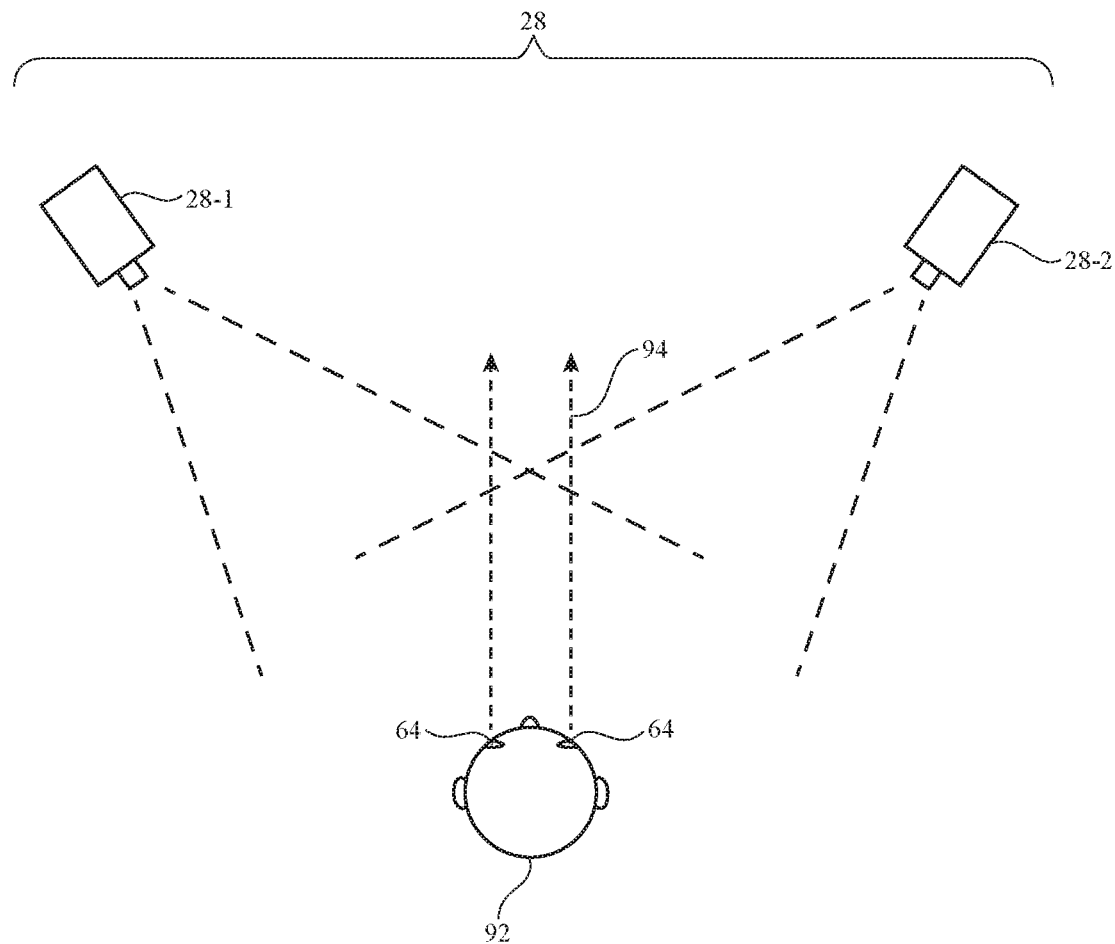
FIG. 6 is a top view of an illustrative sensor such as an image sensor system based on a stereo camera of the type that may be used to gather eye location information in accordance with an embodiment.

Camera 28 may be a stereo camera having two or more individual image sensors, as shown by left camera 28-1 and right camera 28-2 in FIG. 6. The individual cameras in camera system (camera) 28 of FIG. 6 may be used to perform triangulation operations that help control circuitry 30 accurately determine the location of driver 92, the driver's eyes (eyes 64), and the direction of view of the driver (direction of view 94 in the example of FIG. 6). Other types of imaging systems and sensors may be used in determining the direction of the driver's view. Moreover, other sensing techniques (e.g., three-dimensional sensing techniques) may be used such as sensing techniques based on patterned illumination, lidar, and time-of-flight images. The illustrative stereo camera of FIG. 6 is merely illustrative. If desired, cameras such as stereo camera 28 of FIG. 6 may be used outside of vehicle 10 (see, e.g., cameras 28' of FIGS. 3 and 4).

Figure 7:
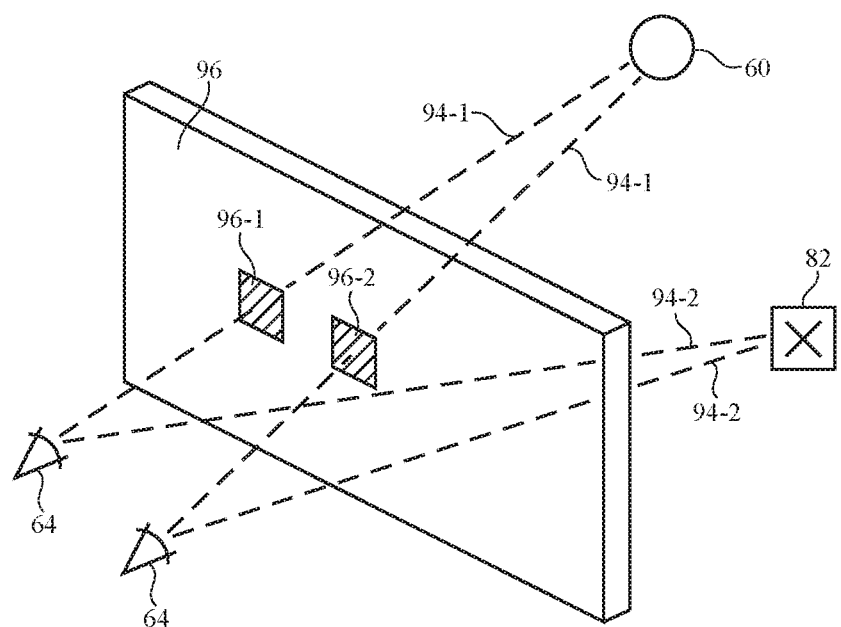
FIG. 7 is a perspective view of an illustrative window with locally darkened portions to reduce glare in accordance with an embodiment.
Figure 8:
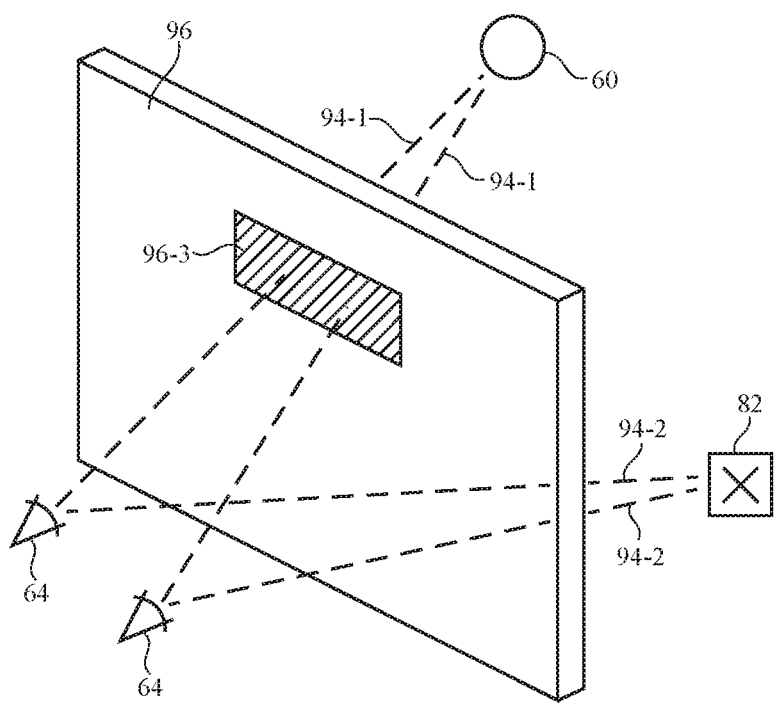
FIG. 8 is a perspective view of an illustrative window with a locally darkened portion to reduce glare in accordance with an embodiment.

FIGS. 7 and 8 are perspective views of illustrative light modulator layers 96 (e.g., light modulators in windows 14). As shown in FIG. 7, multiple individual portions of layer 96 such as portions 96-1 and 96-2 may be darkened based on the measured positions of the driver's eyes 64. Portions 96-1 and 96-2 may be darkened to block light from light source 60 (i.e., when a driver's eyes 64 are looking in direction 94-1) while remaining undarkened portions of layer 96 allow the driver to view external objects such as object 82 (i.e., when a driver's eyes 64 are looking in direction 94-2). If desired, the light blocking portion of light modulator layer 96 may form a single uninterrupted region such as region 96-3 of FIG. 8. Other types of light blocking areas may be used to reduce glare, if desired. The illustrative configuration of FIG. 7 in which each reduced-transmission area (area 96-1 and 96-2) is associated with a respective one of eyes 64 and the illustrative configuration of FIG. 8 in which a single reduced-transmission area (area 96-3) shadows both eyes 64 from glare from light source 60 are merely illustrative.

Figure 9:
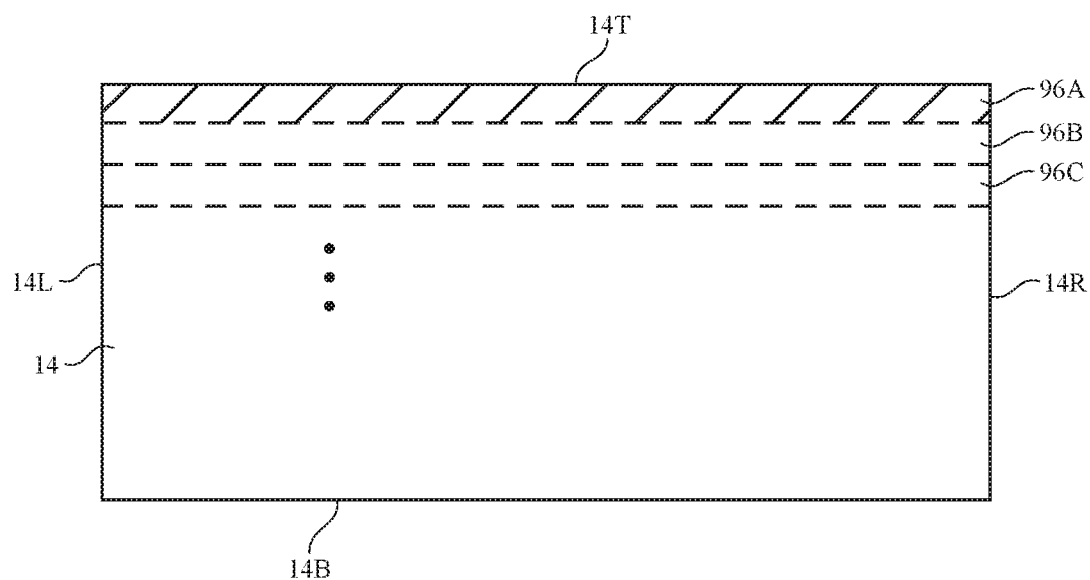
FIG. 9 is a diagram of an illustrative window having horizontal regions that may be individually adjusted to modulate light transmission in accordance with an embodiment.

FIG. 9 is a diagram of an illustrative structure in vehicle 10 such as window 14. Window 14 may be provided with a light modulating layer that can be used to reduce the transmission through one or more selected areas to reduce glare. In the example of FIG. 9, window 14 has top edge 14T, bottom edge 14B, and respective left and right edges 14L and 14R. Window 14 may be a front window, rear window, or side window in vehicle 10. Window 14 may have electrodes or other structures to facilitate the formation of an electronically adjustable sun visor. In particular, a light modulator may be incorporated into window 14 that allows one or more areas such as areas 96A, 96B, 96C, . . . to be selectively darkened (by the same amount or by progressively increasing amounts or other different amounts).

As an example, in a dark and glare-free environment, all of areas 96A, 96B, 96C, . . . may be adjusted to exhibit maximum transmission (i.e., all areas of layer 96 may be clear). When the sun or other source of glare is at a high elevation with respect to window 14, only the uppermost portion of layer 96 can be darkened (see, e.g., darkened area 96A in FIG. 9). When the sun or other source of glare is at a lower angle, more portions of layer 96 can be darkened (e.g., portions 96A and 96B can be darkened or portions 96A, 96B, and 96C can be darkened).

Figure 10:
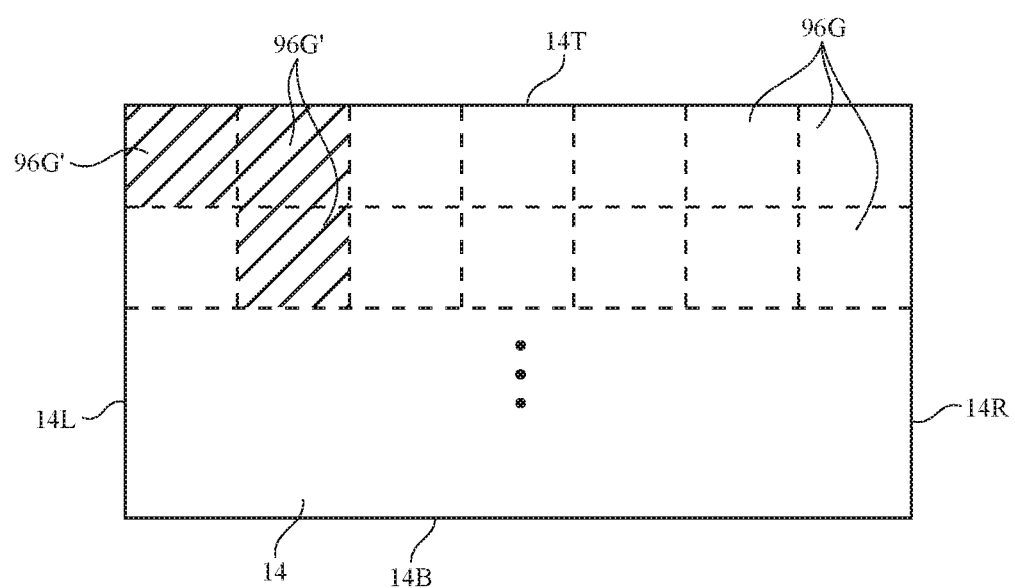
FIG. 10 is a diagram of a window of the type shown in FIG. 9 in which the adjustable light modulation regions form an array with rows and columns in accordance with an embodiment.

In the illustrative arrangement of FIG. 9, the portions of window 14 that are being adjusted have the shape of elongated horizontal regions such as rectangular strips that run parallel to upper edge 14T of window 14. As shown in FIG. 10, an electronically adjustable sun visor may be formed using smaller regions such as regions 96G. In the FIG. 10 example, regions 96G' have been darkened to block glare in the upper left portion of the driver's field of view. When making adjustments that affect the driver's field of view, anti-glare regions may be selected that do not interfere with the driver's primary lines of sight (i.e., the driver's window directly in front of the driver's head will not be blocked, etc.). Adjustable regions of the type shown in FIG. 10 may be used to provide a driver and a passenger in vehicle 10 with individually adjustable regions. Combinations of horizontal light modulator strips (as shown in FIG. 9) and smaller light modulator regions (as shown in FIG. 10) and/or other modulator patterns may be used, if desired. The examples of FIGS. 9 and 10 are merely illustrative. The adjustable regions of the light modulator layers of FIGS. 9 and 10 may be associated with individually controlled electrodes (e.g., in a liquid crystal modulator, electrochromic modulator, or other electrically controlled modulator), may be associated with regions of potential light illumination (e.g., portions of a photochromic layer that can be illuminated with ultraviolet light using light guide structures, beam steering structures, light-emitting diode arrays, or other optical structures), or other individually adjustable light modulator structures.

In photochromic light modulators, light source 36 may apply light 70 when it is desired to darken a portion of a photochromic layer. The area in which light source 36 applies light 70 may be controlled by control circuitry 30, so that control circuitry 30 can control which portions of a window or mirror are selectively darkened. With one suitable arrangement, control circuitry 30 may supply signals to light source 36 that direct light source 36 to steer a beam of output light (light 70) in a desired direction.

Figure 11:
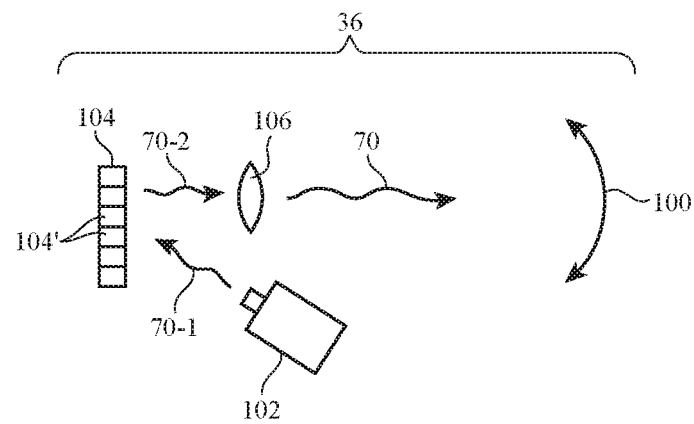
FIG. 11 is a diagram of an illustrative steerable light source based on a light projector system in accordance with an embodiment.

In the example of FIG. 11, light source 36 is a steerable beam light source that produces a beam of light 70 that may be steered in directions such as directions 100. Light emitter 102 (e.g., a light source such as a laser, lamp, or light-emitting diode) may emit light 70-1 (e.g., ultraviolet light or other suitable light). Modulator array 104 may have an array of microelectromechanical systems (MEMs) mirrors or other adjustable reflective micro-mirrors 104'. Mirrors 104' can be individually adjusted to steer light 70-1, thereby producing steered reflected light beam 70-2. Optical systems such as lens structures 106 may be used to collimate and otherwise adjust light 70-2, thereby producing steerable output beam 70. Steerable light beam sources such as light source 36 of FIG. 11 may sometimes be referred to as projector light sources or projector systems.

Figure 12:
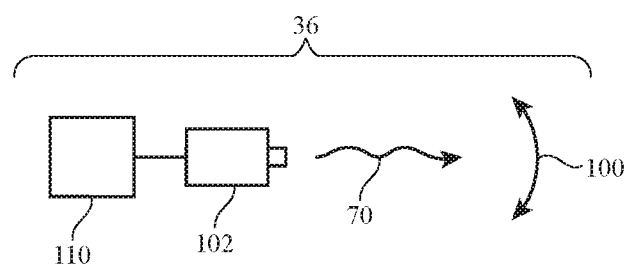
FIG. 12 is a diagram of an illustrative steerable light source based on a laser or light-emitting diode that is oriented using a computer-controlled positioner in accordance with an embodiment.

In the example of FIG. 12, the orientation of light emitter 102 of light source 36 is being adjusted by electrically controllable positioner 110. Positioner 110 may be a stepper motor, a linear electromagnetic actuator, or other positioner that can control the angular orientation and/or the linear position of light emitter 102 and thereby steer output light beam 70 in desired directions such as directions 100.

Figure 13:
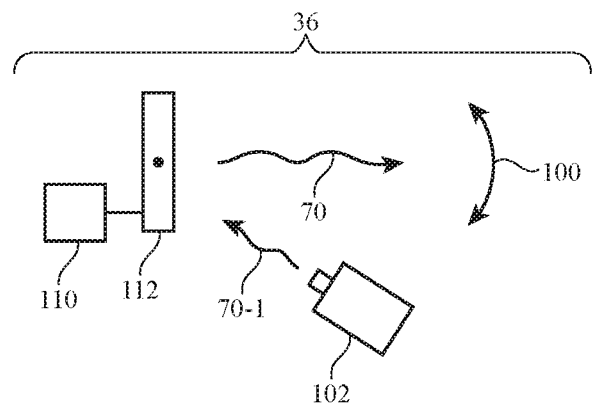
FIG. 13 is a cross-sectional side view of an illustrative steerable light source based on a steerable mirror in accordance with an embodiment.

Another type of system for producing a steerable beam of output light is shown in FIG. 13. As shown in FIG. 13, steerable-beam light source 36 of FIG. 13 may have a light emitter such as light emitter 102 that emits a beam of light such as beam 70-1 that is reflected from mirror 112 to produce light beam 70. The orientation of mirror 112 may be adjusted using electrically controllable positioner 110, thereby steering light beam 70 in directions 100.

Figure 14:
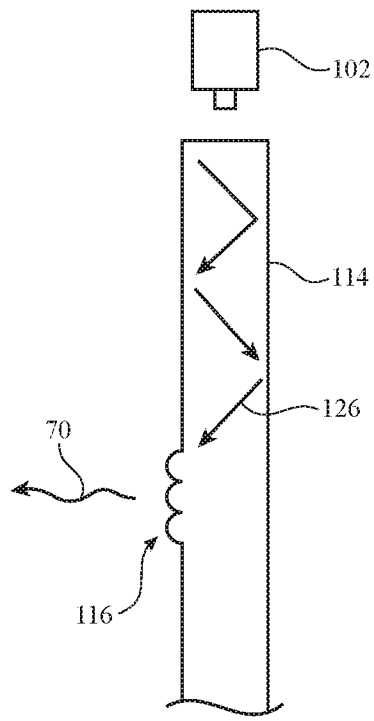
FIG. 14 is a cross-sectional side view of an illustrative light source that emits light from a portion of a light guide layer in accordance with an embodiment.

If desired, light emitter 102 may emit light 126 into a light guide structure such as illustrative light guide layer 114 of FIG. 14. Light 126 that has been emitted from light emitter 102 may be guided within light guide layer 114 in accordance with the principal of total internal reflection. Light guide layer 114 may be formed from a layer of transparent material (e.g., glass, plastic, quartz, fused silica, sapphire, or other clear materials). Light 70 may be scattered out of light guide layer 114 at a desired location by light scattering features 116. Light scattering features 116 may be formed from protrusions, depressions, index-of-refraction discontinuities, metal structures, printed ink, or other structures that help scatter light 70 from light guide layer 114. Light scattering features 116 may be formed at one or more fixed locations on light guide layer 114 or may be formed in electrically controllable locations (e.g., by forming cells with index of refraction characteristics that are electrically adjustable, etc.). Layer 114 may be stacked with other layers on a mirror or window (e.g., in a stack with a photochromic layer, etc.) to form a window or mirror with an integrated light modulator layer.

Figure 15:
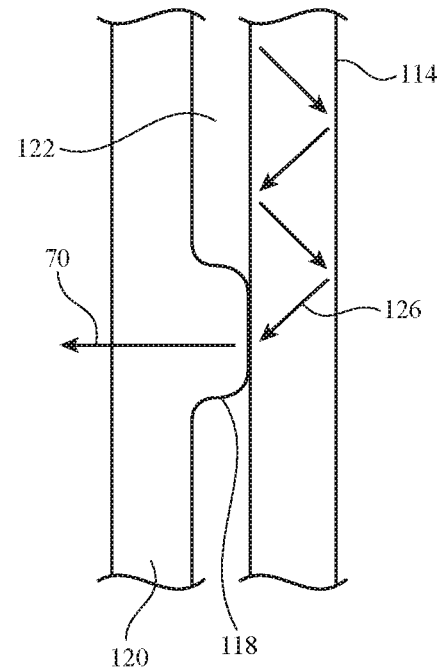
FIG. 15 is a cross-sectional side view of a light guide layer that uses controllable protrusions to emit light at a controllable position along the surface of the light guide layer in accordance with an embodiment.

As shown in FIG. 15, light guide layer 114 may be separated from another transparent layer such as layer 120 by a gap such as gap 122. Gap 122 may be filled with air or other material having an index of refraction that differs from that of layers 120 and 114. For example, gap 122 may be formed from air or other material that has an index of refraction that is less than layers 120 and 114. Using an electrically controllable actuator or other mechanism, a protrusion such a protrusion 118 may be formed in layer 120 that bridges gap 122. In this portion of light guide layer 114, there is no index-of-refraction discontinuity at the interface between layer 114 and gap 122, so light 126 may escape out of layer 114 and pass through layer 120 to form emitted light 70.

Structures of the type shown in FIGS. 14 and 15 and other structures including light guide layers such as layer 114 may be incorporated into light modulators with photochromic layers. The light guide layer and associated structures for emitting light 70 from a desired portion of the light guide layer may be used in selectively darkening a portion of the photochromic layer.

Figure 16:
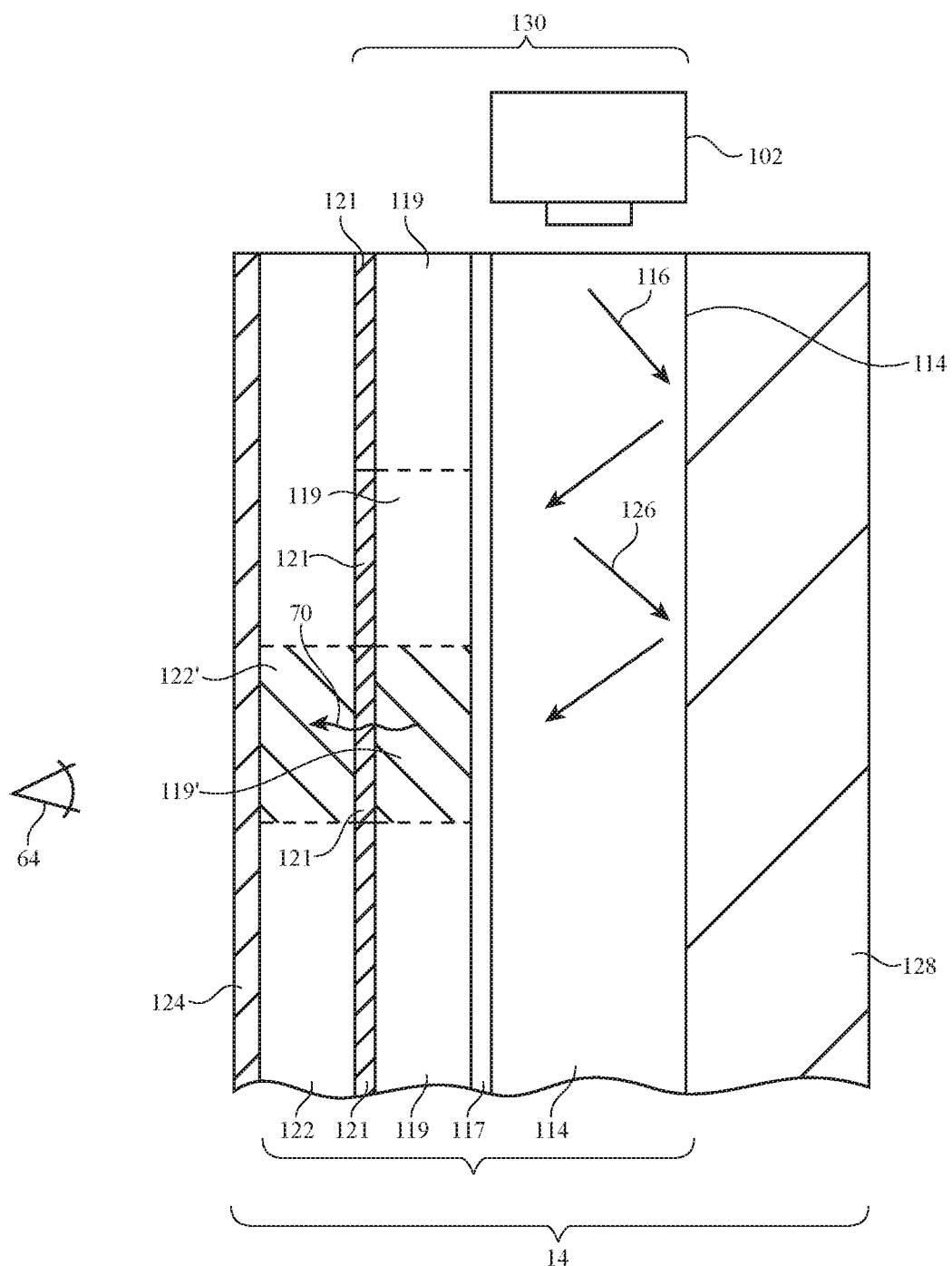
FIG. 16 is a cross-sectional side view of a light modulator with a light guide layer that uses an array of adjustable-index-of-refraction cells to emit light into a photochromic layer at an adjustable location in accordance with an embodiment.

An illustrative window for vehicle 10 that has been formed from a photochromic light modulator that can be illuminated with light from a light guide layer is shown in FIG. 16. In the example of FIG. 16, layers 130 may be used to selectively emit light 70 into region 122' of photochromic layer 122, thereby darkening region 122' to reduce glare. Window 14 may have a transparent support layer such as layer 128 (e.g., one or more layers of glass and/or plastic laminated together to form a structural support layer for window 14). Light guide layer 114 may be formed from a layer of material on the inner surface of window layer 128. Light 126 from light-emitter 102 (e.g., ultraviolet light, etc.) may be emitted into light guide layer 114 and may travel through light guide layer 114 in accordance with the principal of total internal reflection.

Layers 130 may include an array of liquid crystal cells 119. Cells 119 may be formed from a layer of liquid crystal material. Transparent electrodes such as an array of cell-sized transparent electrodes 121 may be formed on the inner surface of photochromic layer 122 or other suitable substrate. A blanket conductive film on the outer surface of light guide layer 114 may form transparent ground electrode 117. The index of refraction of each liquid crystal cell 119 may initially be lower than the index of refraction of layers 114 and 122. To adjust the index-of-refraction of a given one of cells 119, a voltage may be applied between the electrode 121 that is associated with that cell and ground electrode 117. This creates an electric field that adjusts the index of refraction of the given cell. For example, the index of refraction of material 119' may be increased to a value that matches that of layer 114 and that of layer 122. In this scenario, total internal reflection will be locally defeated in the portion of window 114 that is overlapped by cell 119'. As a result, light 70 will leak out of cell 119' into region 122' of photochromic layer 122 and will darken region 122'. Filter layer 124 may be used to block stray light 70. For example, filter layer 124 may be a filter that passes visible light and blocks ultraviolet light, thereby preventing ultraviolet light 70 from reaching the eyes of the driver (eye 64). Filter layers such as ultraviolet light blocking layer 124 may also be used in light modulators in windows and mirrors to help prevent ambient ultraviolet light from prematurely darkening a photochromic layer. For example, filter layer 124 may be placed on one side of a photochromic layer to block ambient ultraviolet light whereas a beam of ultraviolet light 70 may be selectively applied to the photochromic layer from the other side of the photochromic layer.

If desired, light extraction from layer 114 may be controlled using acoustic Bragg gratings. For example, an array of ultrasonic transducers may be located around the periphery of layer 114 and may be used to produce a strong acoustic Bragg grating over the region to be darkened. The Bragg grating helps extract light 116 from layer 114 into the portion of layer 122 to be darkened.

Figure 17:
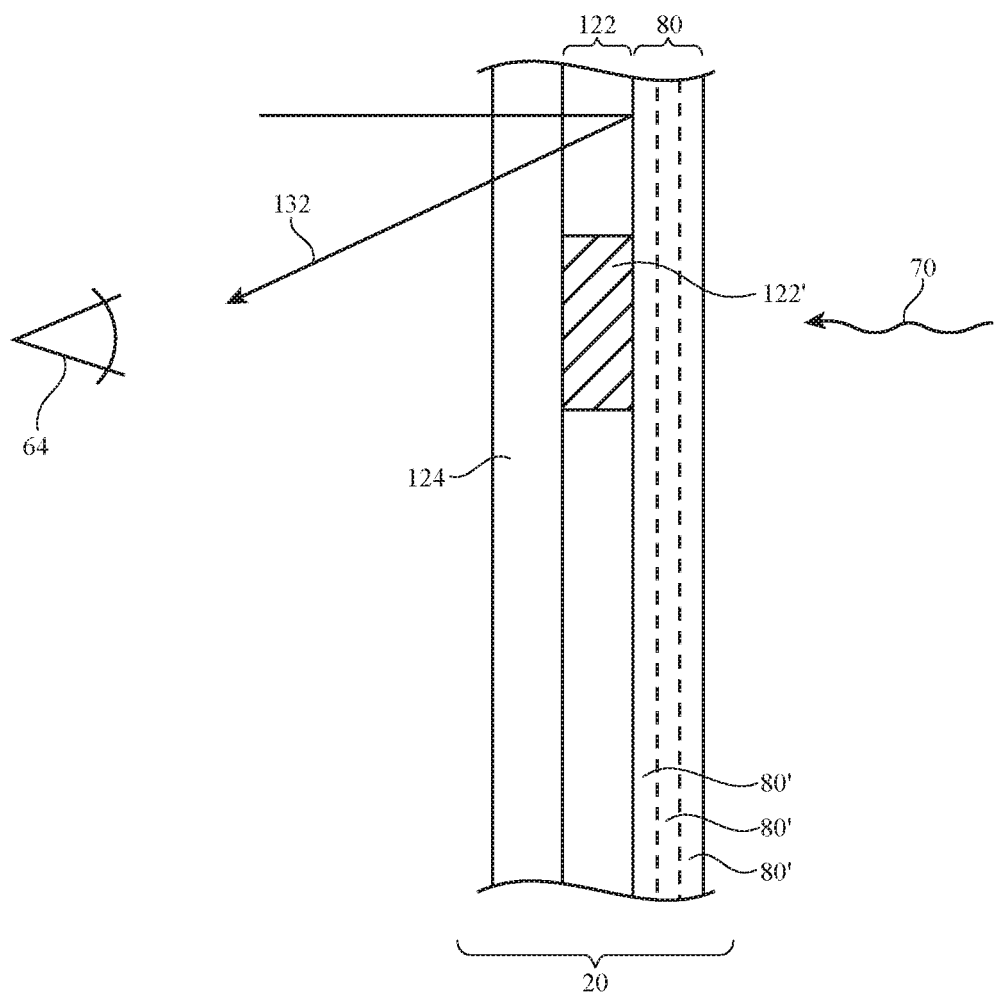
FIG. 17 is a cross-sectional side view of an illustrative mirror having a photochromic layer that is selectively illuminated in a given area from behind the mirror in accordance with an embodiment.

FIG. 17 is a cross-sectional side view of an illustrative mirror for vehicle 10 (e.g., a side vehicle mirror, a rearview vehicle mirror, or other mirror in vehicle 10). In the configuration of FIG. 17, mirror 20 has a reflective layer such as Bragg reflector layer 80 formed from a series of stacked alternating high-index-of-refraction and low-index-of-refraction layers 80'. This arrangement may be used to form a reflective layer that is highly reflecting at visible wavelengths. A driver may therefore view reflections of the driver's surroundings in mirror 20, as indicated by reflected visible light 132. Sublayers 80' may be configured to pass ultraviolet light such as ultraviolet light 70 to photochromic layer 122. Light source 136 may provide output beam 70 (e.g., using a light beam steering arrangement of the type shown in FIGS. 11, 12, and 13, using a planar light guide layer arrangement for distributing light 70 as described in FIGS. 14, 15, and 16, using an array of light-emitting elements, or by using other suitable light source configuration). Light 70 may be directed to layer 122 through Bragg reflector layer 80 (i.e., from the rear of mirror 20). By applying light 70 to a desired region of photochromic layer 122 through Bragg reflector layer 80, that region of photochromic layer 122 may be locally darkened, as shown by darkened region 122' of layer 122. Filter layer 124 may be used to block ultraviolet light 70, thereby preventing ultraviolet light 70 from reaching the eyes of the occupants of vehicle 10 (see, e.g., eye 64 of FIG. 17). Stray ultraviolet light may be prevented from reaching the rear of layer 122 by enclosing mirror 80 (e.g., the rear of mirror 80) in an opaque mirror housing.

Figure 18:
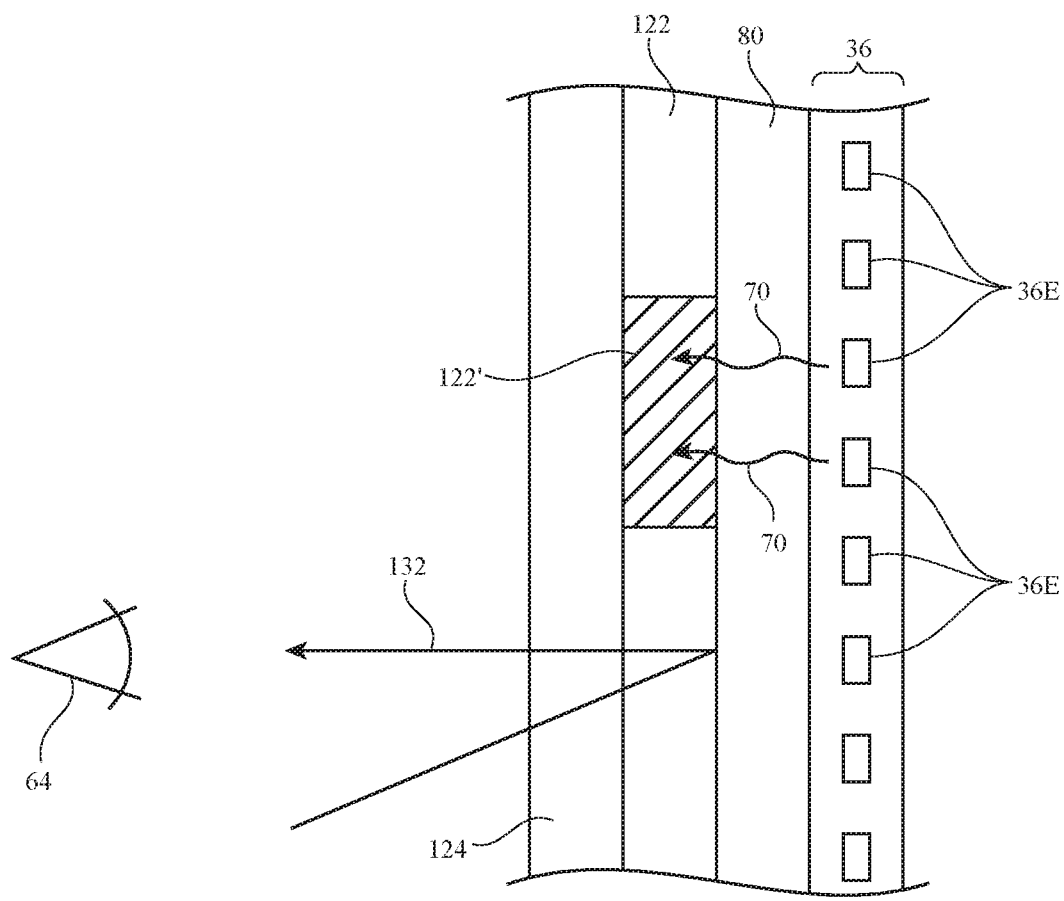
FIG. 18 is a cross-sectional side view of an illustrative mirror having a photochromic layer that is selectively illuminated in a given area a using an array of light sources located behind the mirror in accordance with an embodiment.

In the illustrative configuration of FIG. 18, light 70 is supplied from light source elements 36E of light source 36. Light source 36 may be, for example, an array of ultraviolet light-emitting diodes 36E that are individually addressable. Control circuitry 30 can illuminate a subset of elements 36E to create a desired pattern of output light 70. Light 70 may pass through Bragg reflector layer 80 to illuminate and darken region 122' of photochromic layer 122. Ultraviolet light blocking layer 124 or other filter layer may be used to filter out light 70 while allowing reflected light 132 to pass to and reflect from reflecting layer 80.

Photochromic layers in light modulators for mirrors and windows may be returned to their undarkened state by halting the application of light 70. If desired, bleaching light may be applied to the photochromic layer to help return a darkened portion of the photochromic layer to an undarkened state. As an example, light at a first wavelength (e.g., ultraviolet light 70) may be used to convert a bistable photochromic dye in the photochromic layer from its transparent state to an opaque state. When it is desired to return the darkened region of the photochromic layer to its transparent state, light at a second wavelength (e.g., visible light or infrared light) may be applied to bleach the photochromic dye. The photochromic dye in this type of arrangement may be a p-type photochromic dye.

Figure 19:
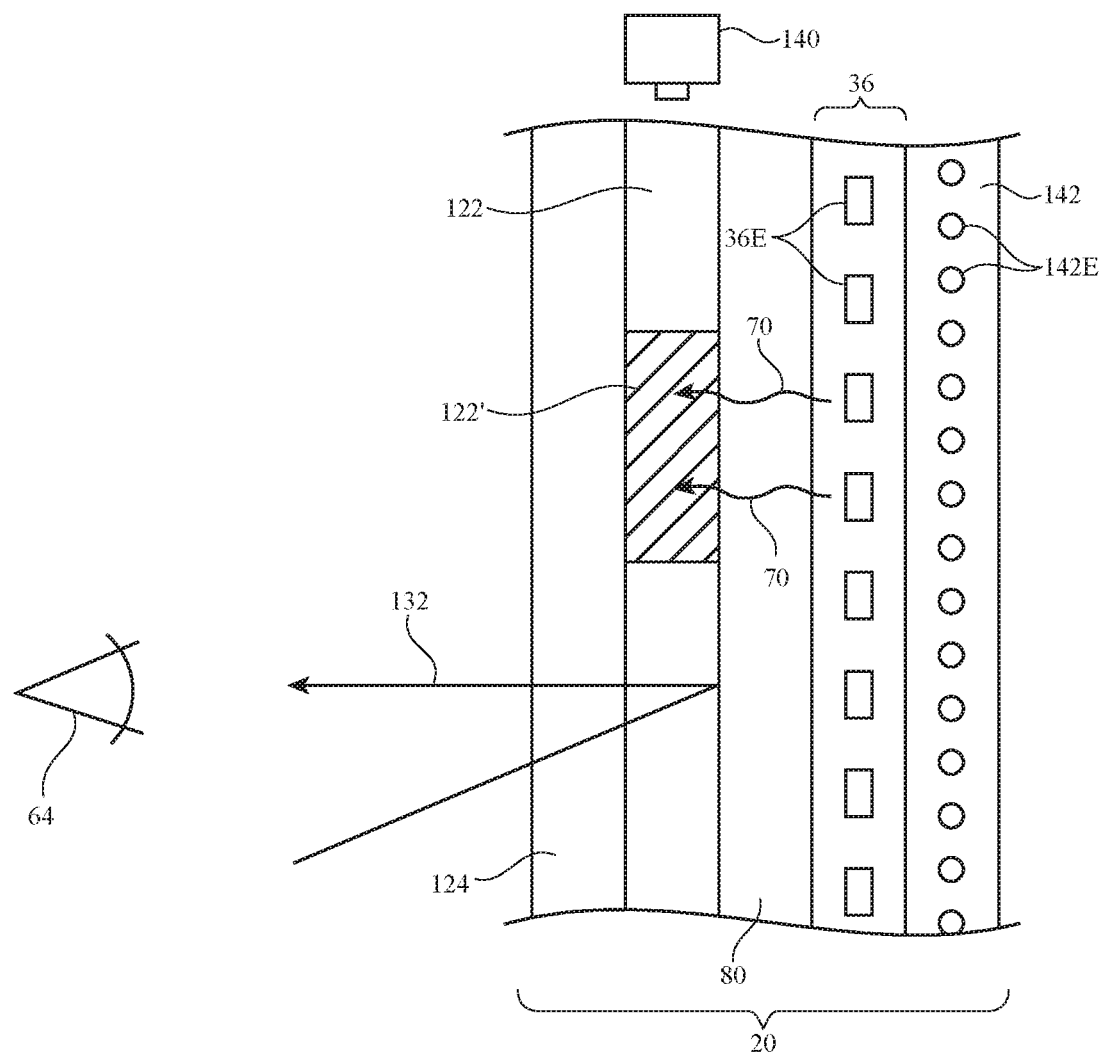
FIG. 19 is a cross-sectional side view of an illustrative mirror having a photochromic layer that is selective illuminated from behind to darken a portion of the photochromic layer and that is bleached using a light source behind the mirror in accordance with an embodiment.

An illustrative configuration for mirror 20 that is based on a light bleached photochromic layer is shown in FIG. 19. As shown in FIG. 19, mirror 20 may have a reflective layer such as Bragg reflector 80. Bragg reflector 80 may reflect visible light 132 to allow the structures of FIG. 19 to serve as a mirror. Bragg reflector layer 80 may be configured to allow ultraviolet light and infrared light to pass through layer 80. When it is desired to darken a portion of photochromic layer 122, selected light-emitting elements 36E of layer 36 may emit ultraviolet light 70 into that portion of layer 122 (see, e.g., darkened portion 122' of layer 122). Light for bleaching region 122' may be supplied from light source 140 (e.g., a visible or infrared light source that emits light into layers 122 along one of the edges of layer 122) and/or from bleaching light source 142. Source 142 may contain an array of light-emitting elements 142E in a layer on the rear of mirror 20 or may be formed from a single element (or multiple elements) such as a stand-alone light-emitting diode that is not formed as part of a layer of light-emitting elements. Source 142 may supply bleaching light that passes through reflector layer 80 to bleach region 122' of photochromic layer 120. The light from bleaching light source 142 may be infrared light that passes through Bragg reflector 80. If desired, Bragg reflector 80 may be configured to pass a narrow band of visible light wavelengths. The pass band may be aligned with the wavelength of bleaching light emitted by light source 142, so that light from bleaching light source 142 can pass through Bragg reflector 80 to bleach photochromic layer 122. The pass band may be sufficiently narrow to allow most visible light on the front of mirror 20 to be reflected (see, e.g., light 132 of FIG. 19).

Figure 20:
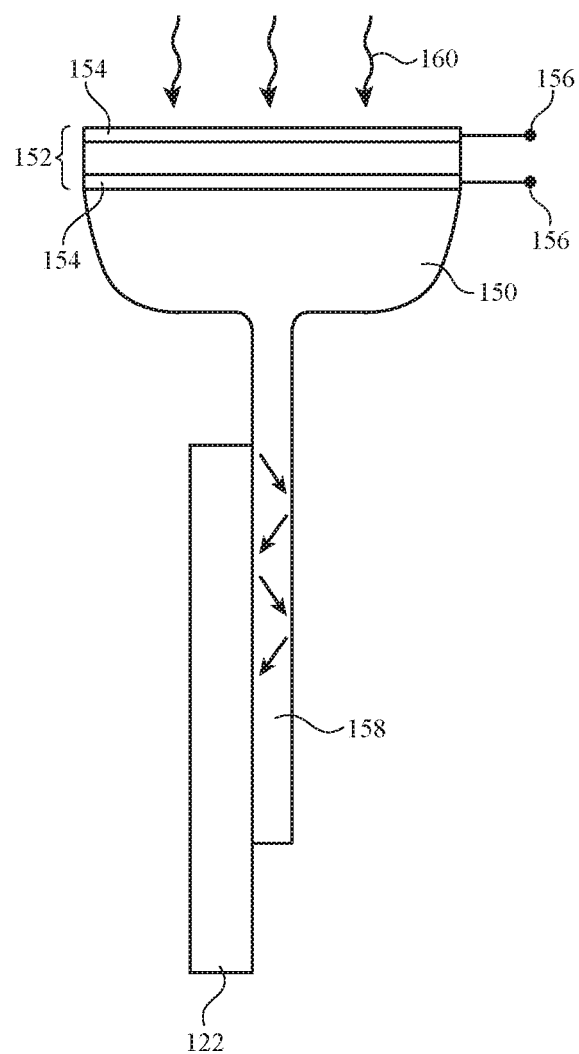
FIG. 20 is a cross-sectional side view of a light modulator having a photochromic layer and an illustrative light source based on a light concentrating structure with an electrically controlled shutter in accordance with an embodiment.

If desired, a light concentrator such as light concentrator 150 of FIG. 20 may be used to gather and concentrate sunlight or other ambient light. This concentrated light may then be used to form light that darkens portions of photochromic layer 122 or light that bleaches photochromic layer 122 in a mirror or window. A liquid crystal shutter or other electrically controllable or mechanically controlled shutter such as shutter 152 may be used to adjust the amount of light 160 (e.g., sunlight) that enters light concentrator 150. Shutter 152 may receive control signals from control circuitry 30 on transparent electrodes 154 (e.g., indium tin oxide electrodes) via terminals 156.

The state of the signals on electrodes 154 may control the amount of light transmission through shutter 152 to light concentrator 150. When shutter 152 is closed, none of light 160 reaches light concentrator 150 and therefore no light is distributed to layer 122 via light guide layer 158. When shutter 152 is open, light 160 may be distributed to photochromic layer 122 via light guide layer 158. If desired, light modulator structures with arrays of electrodes or other structures may be interposed between light guide 158 and layer 122 and used to determine which regions of layer 122 receive light from light guide layer 158 (see, e.g., arrangements of the type described in connection with FIGS. 14, 15, and 16).

Figure 21:
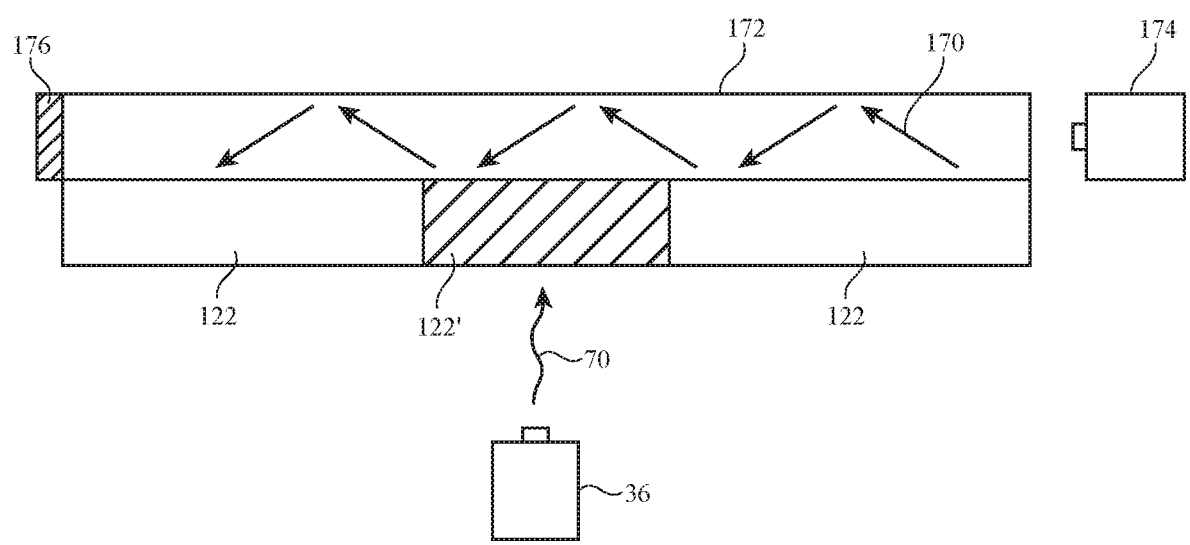
FIG. 21 is a cross-sectional side view of an illustrative light modulator having a photochromic layer that is locally darkened by a steerable light beam and that is bleached using blanket illumination in accordance with an embodiment.

In the illustrative arrangement of FIG. 21, light from light source 36 (e.g., a steerable beam light source producing ultraviolet light 70) is being used to selectively darken portion 122' of photochromic layer 122. Layer 122 may be incorporated into a mirror or window. When it is desired to bleach portion 122', bleaching light 170 (e.g., infrared light) may be emitted into light guide layer 172 from bleaching light source 174 (e.g., a light-emitting diode emitting bleaching visible or infrared light). Reflector 176 may be used to help recycle light 170. Light scattering features in layer 172 may scatter a portion of light 170 into layer 122 to bleach layer 122. In photo-bleaching arrangements such as the illustrative photo-bleaching arrangement of FIG. 21, photochromic layer 122 is preferably formed from a photobleachable (p-type) photochromic dye.

If desired, an electrically adjustable sun visor such as the light modulating structures of FIGS. 9 and 10 or other light modulator for reducing glare through windows 14 or in mirrors 20 may be formed using individually adjustable light modulator cells controlled by applied electric signals. These cells may be formed from liquid crystal shutter structures or other individually addressable light modulators and may be formed in any suitable pattern across windows 14 and/or mirrors 20.

Figure 22:
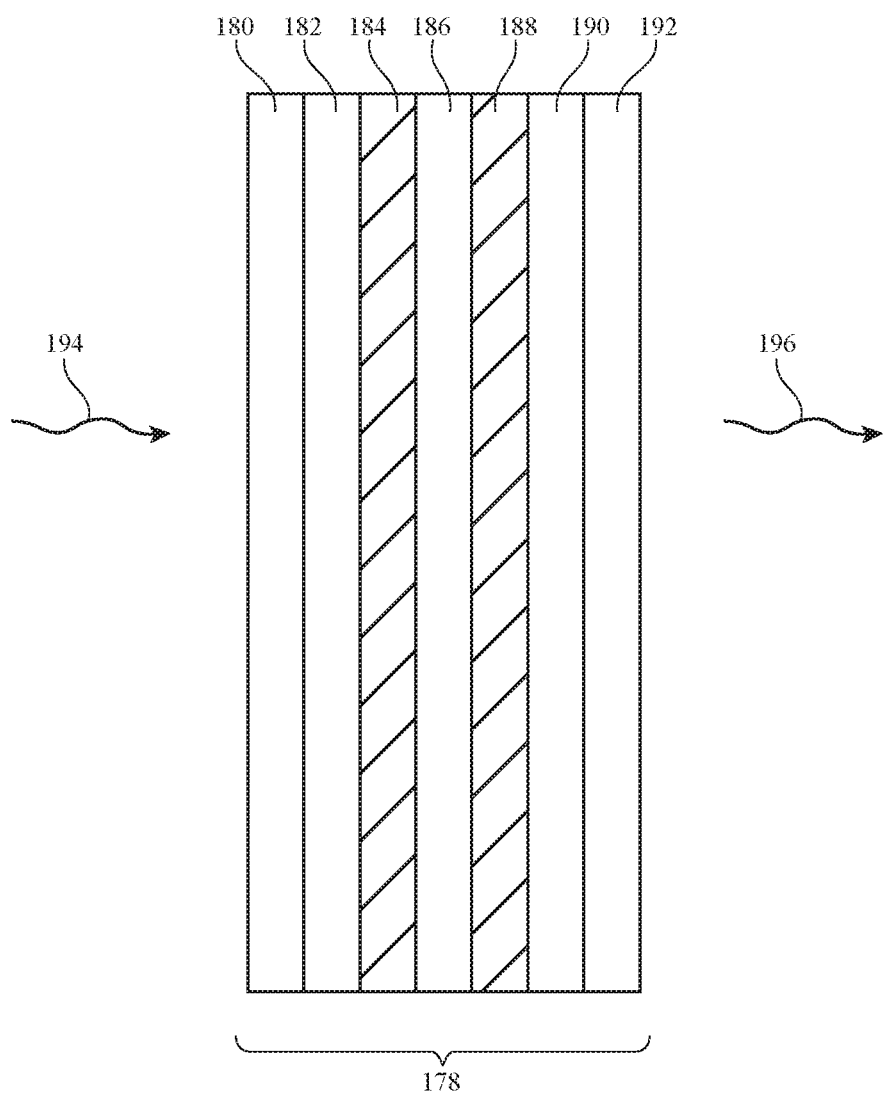
FIG. 22 is a cross-sectional side view of an illustrative light modulator based on a liquid crystal cell in accordance with an embodiment.

A cross-sectional side view of an illustrative light modulating cell in a liquid crystal light modulator layer is shown in FIG. 22. As shown in FIG. 22, light modulator 178 includes liquid crystal layer 186 sandwiched between transparent conducting electrodes 184 and 188 (e.g., indium tin oxide electrodes). Electrode 184 may be formed on substrate 182 and electrode 188 may be formed on substrate 190. Substrates 182 and 190 may be clear transparent layers of material such as plastic or glass. Layers 182, 184, 186, 188, and 190 may be sandwiched between polarizers 180 and 192. The amount of voltage applied across electrodes 184 and 188 controls the electric field in layer 186, which controls the polarization of light passing through layer 186. In conjunction with the operation of polarizers 180 and 192, this allows voltage adjustments on electrodes 184 and 188 to control the amount of light 194 that passes through modulator 178 to form transmitted light 196. When a first voltage is applied, for example, transmission may be high (i.e., modulator 178 may be transparent and the intensity of light 196 may equal the intensity of light 194). When a second voltage is applied, transmission may be low (i.e., modulator 178 may be darkened so that the intensity of light 196 is significantly reduced relative to that of light 194). Multiple different adjustment levels may be supported (e.g., to provide areas that are black, other areas that are gray, and yet other areas that are light gray). Gaps between individual indium tin oxide electrodes may be filled with an index-matched insulator or structures of the type shown in FIG. 22 may be embedded in an index-matched substrate to reduce light scattering and diffraction.

Figure 23:
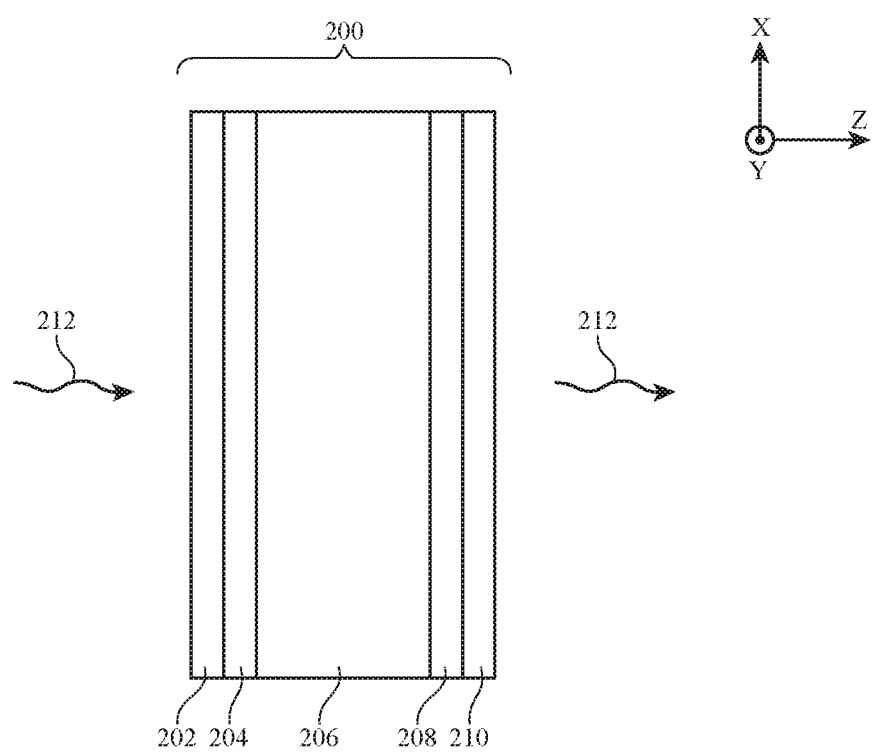
FIG. 23 is a cross-sectional side view of an illustrative electrochromic light modulator in accordance with an invention.

Another type of electrically controllable light modulator cell that may be used in forming glare reducing light modulator structures for windows 14 and mirrors 20 is shown in FIG. 23. Light modulator cell 200 of FIG. 23 is based on an electrochromic device. The electrochromic structures of cell 200 include electrodes such as electrode 202 and electrode 210. Electrodes 202 and 210 may extend along lateral dimensions X and Y that lie perpendicular to dimension Z. Electrode 202 is adjacent to electrochromic layer 204 and electrode 210 is adjacent to electrochromic layer 208. A current may be applied to electrochromic layers 204, 206, and 208 to either darken (color) or lighten (discolor) cell 200. Layers 204, 206, and 208 may be, for example, materials that support an oxidation-reduction reaction in which the polarity of the applied electrical signal determines whether cell 200 is darkened or lightened. By increasing or decreasing the transmission of the light modulating layer of cell 200, the amount of light 212 that passes through cell 200 can be controlled.

With one illustrative configuration, electrochromic material 204 is a layer of $Li_xNiO$ formed as a coating on electrode 202, electrochromic material 208 is a layer of $WO_3$ formed as a coating on electrode 210, and material 206 is a layer of a gel electrolyte such as LiNiOP that is interposed between the $Li_xNiO$ and $WO_3$ layers. With this type of configuration, cell 200 can be darkened or lightened by applying current through layers 204, 206, and 208 using electrodes 202 and 210. The NiO material of layer 204 is brownish in color when undoped, but turns transparent when doped with Li. The $WO_3$ material of layer 208 is bluish in color when doped by Li, but turns transparent when not doped by Li. When it is desired to darken cell 200, a positive voltage may be applied to electrode 202 relative to electrode 208. This causes Li+ ions to be injected into electrolyte layer 206 from layer 204 and causes Li+ ions to form $LiWO_3$ complexes at the interface between layers 206 and 208, thereby coloring both layers 204 and 208 and darkening cell 200. When it is desired to render cell 200 transparent, a negative voltage may be applied to electrode 202 relative to electrode 210. This causes Li+ ions to be injected into layer 206 from layer 208, leaving behind undoped $WO_3$ in layer 208 and causes LiNiO complexes to form at the interface between layers 204 and 206, thereby uncoloring both layers 204 and 208 and rendering cell 200 transparent.

Figure 24:
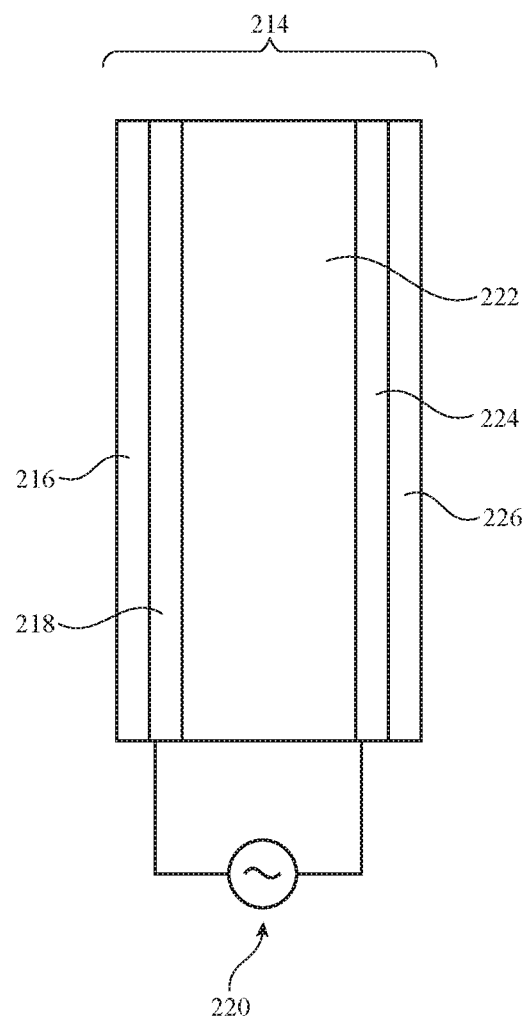
FIG. 24 is a cross-sectional side view of an illustrative guest-host liquid crystal modulator in accordance with an embodiment.

Guest-host liquid crystal devices may also be used to form liquid crystal light modulators for reducing glare in windows 14 and mirrors 20. An illustrative guest-host liquid crystal modulator is shown in FIG. 24. As shown in FIG. 24, modulator layer 214 may have a guest-host liquid crystal layer such as layer 222 interposed between substrate layers 216 and 226. Transparent electrodes 218 and 224 (e.g., indium tin oxide electrodes) may be formed on substrates 216 and 226. The state of the modulator cell formed from layer 214 may be adjusted by adjusting the alternating current signal applied to electrodes 218 and 224. When control circuitry 30 directs signal source 220 to apply a first signal, layer 214 may be transparent and when control circuitry 30 directs signal source 220 to apply a second signal, layer 214 may be opaque (e.g., darkened to block glare for a window or mirror). Modulator cells such as the illustrative cells of FIGS. 22, 23, and 24 or other suitable modulator cells may be patterned in modulator patterns of the type shown in FIG. 9 and FIG. 10 (e.g., to implement an electrically adjustable sun visor), may be formed in an array of rectangular pixels that covers all of a mirror or window (e.g., to form an active glare reducing matrix with individually addressable darkened areas), or may be used in any other portion of a light modulator structure to reduce glare in windows and mirrors for vehicle 10 or other suitable system.

Figure 25:
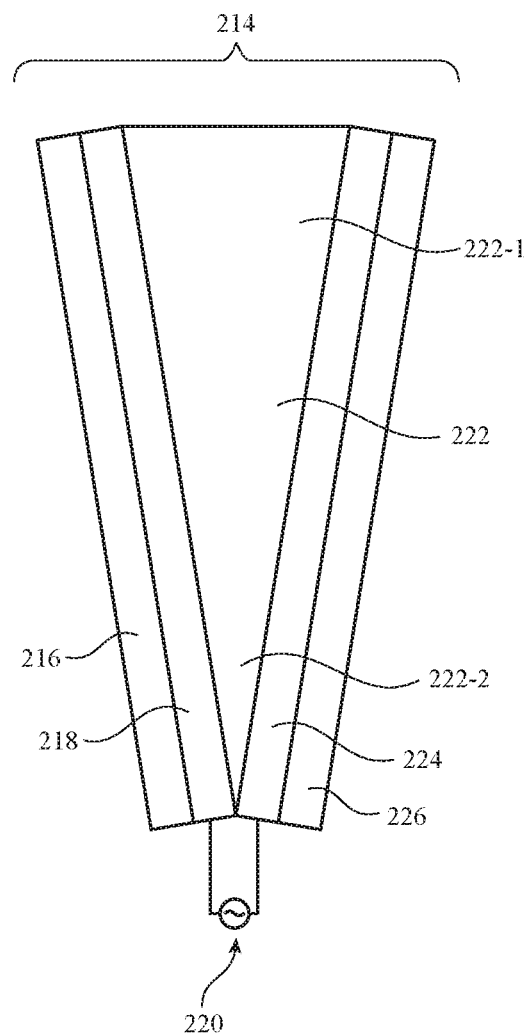
FIG. 25 is a cross-sectional side view of an illustrative modulator such as a guest-host liquid crystal modulator in which the amount of light modulation that is produced varies as a function of position across the light modulator in accordance with an embodiment.

FIG. 25 is a cross-sectional side view of an illustrative wedge shape guest-host liquid crystal modulator. Modulator 214 of FIG. 25 may be controlled by controlling the signal applied to electrodes 218 and 224 as described in connection with modulator 214 of FIG. 24. Due to the increased thickness of liquid crystal layer 222 at end 222-1 relative to end 222-2, end 222-1 will darken more than end 222-2 during modulation. This type of arrangement may be used to provide a modulation gradient (i.e., a sun visor "tint" that is darker near upper edge 14T of window 9 and that is progressively lighter at increasing distances into window 14 from edge 14T). Light modulators based on other light modulation technology may also be provided with regions of different thickness (and therefore light modulation). The example of FIG. 25, which is based on a guest-host liquid crystal modulator, is merely illustrative.

In accordance with an embodiment, a system for a vehicle that reduces glare associated with exterior light shining into the eyes of an occupant of the vehicle is provided that includes a sensor that gathers information on the eyes, and a light modulator that includes a photochromic layer, a light source configured to selectively darken an area of the photochromic layer, and a source of additional light that is configured to bleach the darkened area of the photochromic layer, the light modulator is configured reduce the light by selectively darkening the area based at least partly on the information.

In accordance with another embodiment, the light source includes an electrically steerable ultraviolet light source configured to generate and steer the ultraviolet light.

In accordance with another embodiment, the light source includes an array of light-emitting elements.

In accordance with another embodiment, the system includes a vehicle window, the light modulator is coupled to the vehicle window.

In accordance with another embodiment, the vehicle window is interposed between an interior region in the vehicle and an exterior region outside of the vehicle and the light source is in the interior region.

In accordance with another embodiment, the vehicle window is interposed between an interior region in the vehicle and an exterior region outside of the vehicle and the light source is in the exterior region.

In accordance with another embodiment, the system includes a vehicle mirror, the light modulator is coupled to the vehicle mirror.

In accordance with another embodiment, the vehicle mirror has a first side that reflects the light and has an opposing side that receives ultraviolet light from the light source.

In accordance with another embodiment, the vehicle mirror includes a Bragg reflector through which ultraviolet light from the light source passes.

In accordance with another embodiment, the light source includes an ultraviolet light source and the source of the additional light is an infrared light source that is configured to apply infrared light to the photochromic layer.

In accordance with another embodiment, the system includes a filter layer.

In accordance with another embodiment, the filter layer is configured to pass visible light and block ultraviolet light.

In accordance with another embodiment, the system includes at least one ultrasonic transducer configured to produce an acoustic Bragg grating.

In accordance with another embodiment, the photochromic layer has an edge and the source of the additional light includes an infrared light source that emits infrared light into the photochromic layer along the edge.

In accordance with another embodiment, the glare is associated with light from an external object, the system includes one or more sensors that are configured to gather information on where the external object is located and the light modulator is further configured reduce the light by selectively darkening the area based at least partly on the information on where the external object is located.

In accordance with an embodiment, a vehicle mirror is provided that includes a reflective layer that reflects visible light, a light source that produces light that passes through the reflective layer, and a photochromic layer coupled to the reflective layer that is selectively darkened where exposed to the light from the light source that has passed through the reflective layer.

In accordance with another embodiment, the reflective layer includes a Bragg reflector.

In accordance with another embodiment, the light source includes an ultraviolet light source and the light from the light source includes ultraviolet light that darkens a local area of the photochromic layer.

In accordance with an embodiment, a vehicle window is provided that includes a transparent layer, an array of light-emitting diodes that produces light, and a photochromic layer on the transparent layer that is selectively darkened where exposed to the light from the array of light-emitting diodes.

In accordance with another embodiment, the vehicle window includes an infrared light source that is configured to apply infrared light to the photochromic layer to bleach the photochromic layer.

In accordance with another embodiment, the vehicle window includes a filter configured to allow visible light to pass and to block ultraviolet light.

The foregoing is merely illustrative and various modifications can be made by those skilled in the art without departing from the scope and spirit of the described embodiments. The foregoing embodiments may be implemented individually or in any combination.

What is claimed is:

1. A system that reduces glare associated with exterior light shining into a vehicle, comprising:
    a sensor that gathers eye location information;
    a first light source;
    a second light source; and
    a light modulator that includes a photochromic layer, wherein:
the photochromic layer comprises a material that selectively darkens where exposed to light from the first light source and that selectively is bleached where exposed to light from the second light source, and
the light modulator is configured to selectively expose an area of the photochromic layer to light from the first and second light sources, wherein the area exposed is based at least partly on the eye location information.

2. The system defined in claim 1 wherein the first light source comprises an ultraviolet light source configured to electrically generate and steer the ultraviolet light.

3. The system defined in claim 1 wherein the first light source comprises an array of individually addressable ultraviolet light-emitting elements, the system further comprising a vehicle mirror that receives ultraviolet light from the individually addressable ultraviolet light-emitting elements.

4. The system defined in claim 1 further comprising a vehicle window, wherein the light modulator is coupled to the vehicle window.

5. The system defined in claim 4 wherein the vehicle window is interposed between an interior region in the vehicle and an exterior region outside of the vehicle and wherein the light source is in the interior region.

6. The system defined in claim 4 wherein the vehicle window is interposed between an interior region in the vehicle and an exterior region outside of the vehicle and wherein the light source is in the exterior region.

7. The system defined in claim 1 further comprising a vehicle mirror, wherein the light modulator is coupled to the vehicle mirror.

8. The system defined in claim 7 wherein the vehicle mirror has a first side that reflects the exterior light and has an opposing side that receives ultraviolet light from the first light source.

9. The system defined in claim 7 wherein the vehicle mirror comprises a Bragg reflector through which ultraviolet light from the first light source passes.

10. The system defined in claim 1 wherein the first light source comprises an ultraviolet light source and wherein the second light source is an infrared light source that is configured to apply infrared light to the photochromic layer.

11. The system defined in claim 1 further comprising a filter layer.

12. The system defined in claim 11 wherein the filter layer is configured to pass visible light and block ultraviolet light.

13. The system defined in claim 1 further comprising at least one ultrasonic transducer configured to produce an acoustic Bragg grating.

14. The system defined in claim 1 wherein the photochromic layer has an edge and wherein the second light source comprises an infrared light source that emits infrared light into the photochromic layer along the edge.

15. The system defined in claim 1 wherein the glare is associated with light from an external object, the system further comprising one or more sensors that are configured to gather information on a direction from which the external object is projecting light towards a location associated with the eye location information and wherein the light modulator is further configured to selectively expose an area of the photochromic layer to light from the first light source at least partly based on the information on the direction from which the external object is projecting the light.

16. A vehicle mirror, comprising:
    a reflective layer that reflects visible light and transmits ultraviolet light;
    a light source that produces light; and
    a photochromic layer coupled to the reflective layer, wherein the photochromic layer comprises a material that selectively darkens where exposed to the light from the light source, wherein the reflective layer is interposed between the light source and the photochromic layer, and wherein the reflective layer is configured to pass light from the light source to the photochromic layer.

17. The vehicle mirror defined in claim 16 wherein the reflective layer comprises a Bragg reflector.

18. The vehicle mirror defined in claim 17 wherein the light source comprises an ultraviolet light source, the photochromic layer comprises a material that darkens in reaction to ultraviolet light, and the light from the light source comprises ultraviolet light that causes the photochromic layer to darken in a local area.

19. A vehicle window, comprising:
    a transparent layer;
    an array of individually addressable light-emitting diodes that produces light; and
    a photochromic layer on the transparent layer, wherein the photochromic layer comprises material configured to selectively darken where exposed to the light from a subset of the array of individually addressable light-emitting diodes.

20. The vehicle window defined in claim 19 further comprising an infrared light source that is configured to apply infrared light to the photochromic layer to bleach the photochromic layer.

21. The vehicle window defined in claim 19 further comprising a filter configured to allow visible light to pass and to block ultraviolet light.

\* \* \* \* \*